United States Patent
Hatori et al.

(10) Patent No.: US 9,904,011 B2
(45) Date of Patent: Feb. 27, 2018

(54) OPTICAL WAVEGUIDE, OPTICAL INTERPOSER AND LIGHT SOURCE

(71) Applicants: FUJITSU LIMITED, Kawasaki-shi, Kanagawa (JP); NEC Corporation, Minato-ku, Tokyo (JP)

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC CORPORATION, Tokyo (JP)

(*) Notice: Subject to any disclaimer, the term of this patent is extended or adjusted under 35 U.S.C. 154(b) by 713 days.

(21) Appl. No.: 14/165,845

(22) Filed: Jan. 28, 2014

(65) Prior Publication Data

US 2014/0233881 A1 Aug. 21, 2014

(30) Foreign Application Priority Data

Feb. 15, 2013 (JP) .................................. 2013-027473

(51) Int. Cl.
*G02B 6/122* (2006.01)
*G02B 6/12* (2006.01)
*G02B 6/125* (2006.01)

(52) U.S. Cl.
CPC ....... *G02B 6/1228* (2013.01); *G02B 6/12002* (2013.01); *G02B 6/12004* (2013.01); *G02B 6/125* (2013.01)

(58) Field of Classification Search
CPC ... G02B 6/12002; G02B 6/1228; G02B 6/305
See application file for complete search history.

(56) References Cited

U.S. PATENT DOCUMENTS

| 7,343,054 | B1 | 3/2008 | Lee et al. | |
| 2004/0052467 | A1* | 3/2004 | Blauvelt | B82Y 20/00 |
| | | | | 385/50 |
| 2012/0230635 | A1 | 9/2012 | Yoshida | |
| 2015/0010266 | A1* | 1/2015 | Webster | G02B 6/122 |
| | | | | 385/14 |

FOREIGN PATENT DOCUMENTS

| JP | 2002-319731 A | 10/2002 |
| JP | 2008-165241 A | 7/2008 |
| JP | 2008-261952 A1 | 10/2008 |
| WO | 2011/036818 A1 | 3/2011 |

OTHER PUBLICATIONS

Office Action issued for counterpart JP Application No. 2013-027473 dated Aug. 30, 2016; translation of the relevant part.

* cited by examiner

*Primary Examiner* — Ryan Lepisto
*Assistant Examiner* — Erin Chiem
(74) *Attorney, Agent, or Firm* — Kratz, Quintos & Hanson, LLP

(57) ABSTRACT

An optical waveguide includes a substrate, a first core provided over the substrate and having a first taper region that extends from one side toward the other side and has a sectional area that decreases toward the other side, and a plurality of second cores provided over the substrate and over or under the first core with a first cladding layer sandwiched therebetween and extending in parallel to the substrate and the first core.

20 Claims, 9 Drawing Sheets

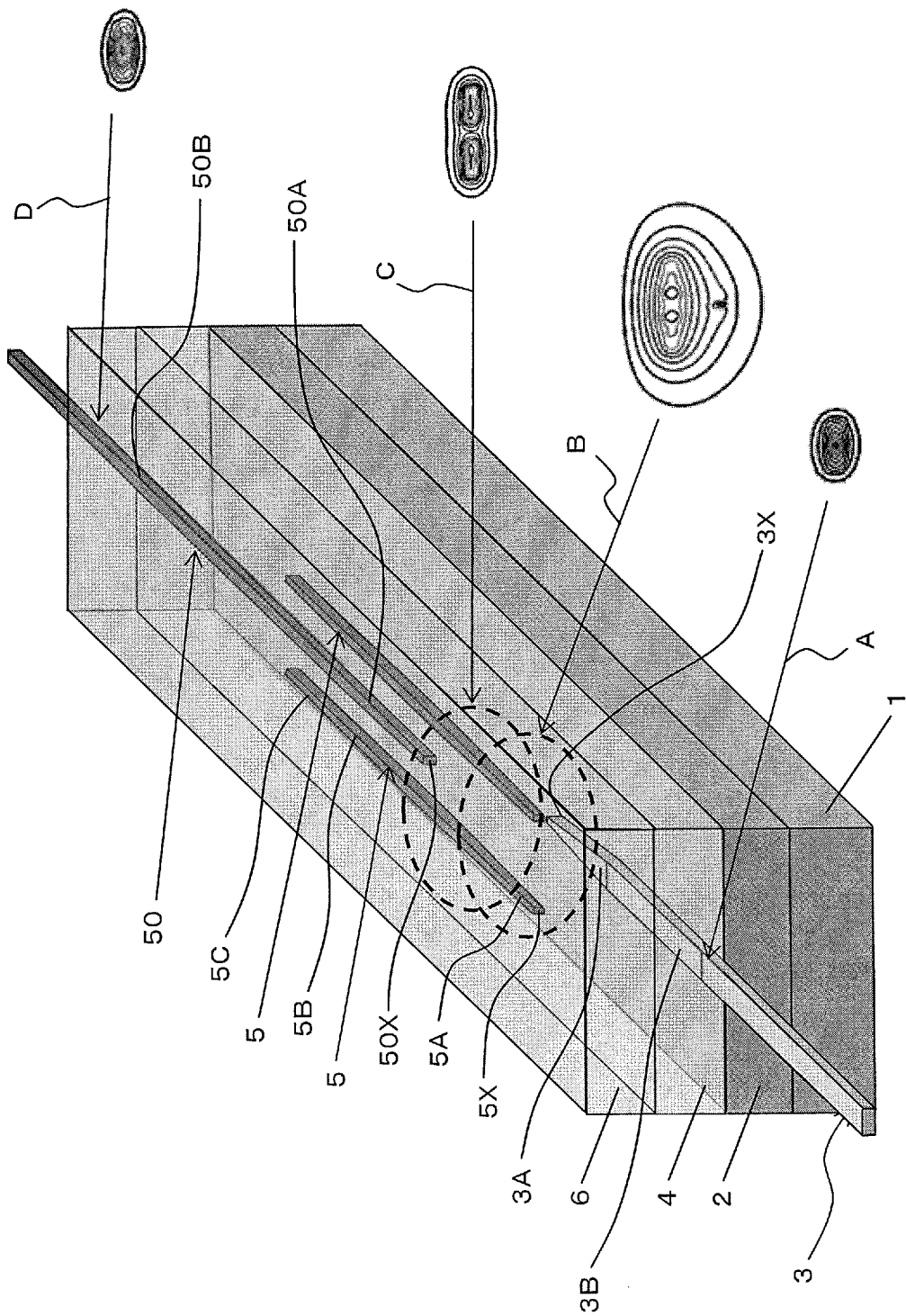

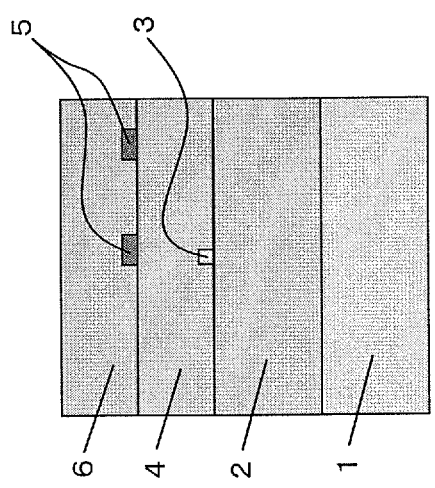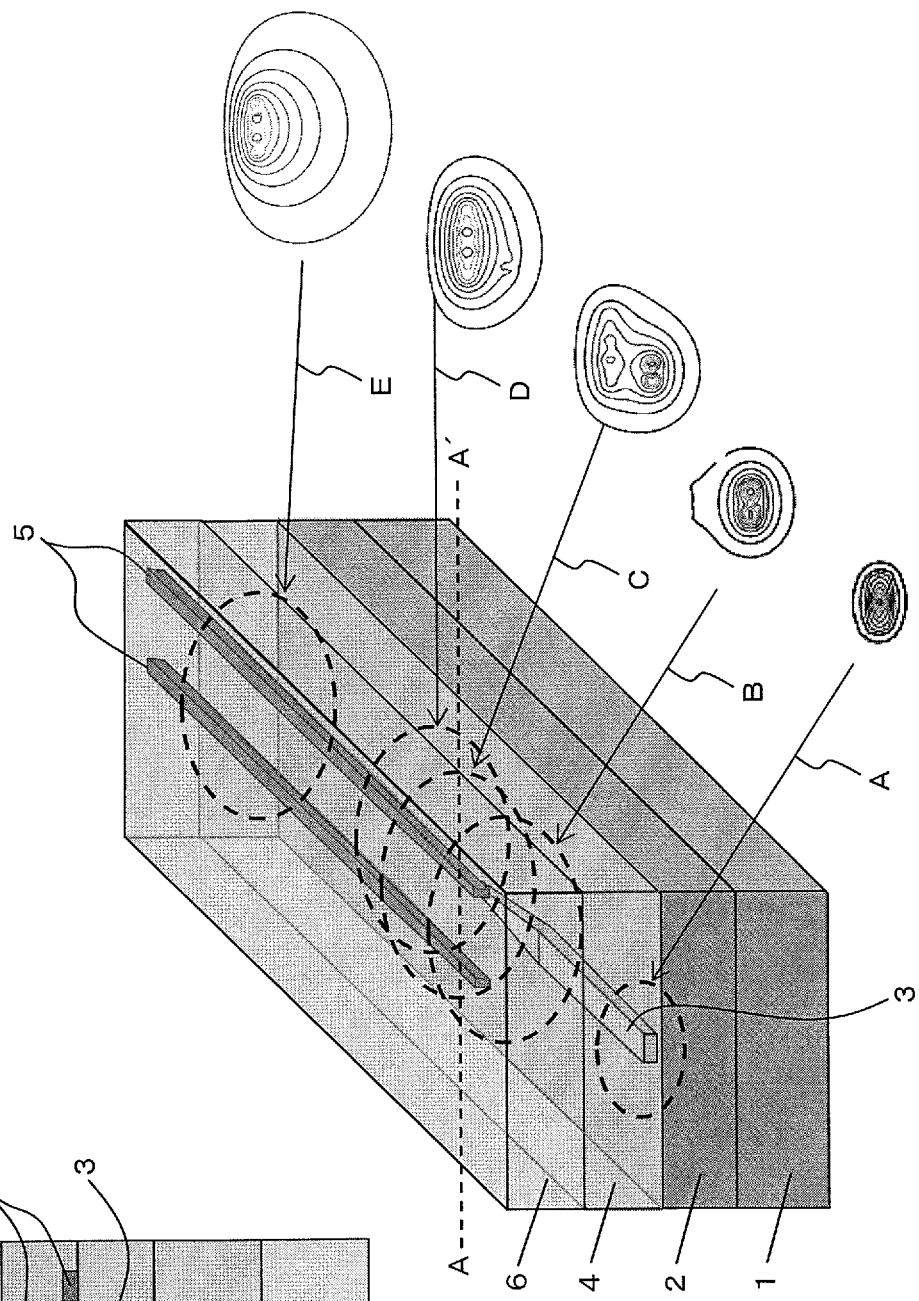

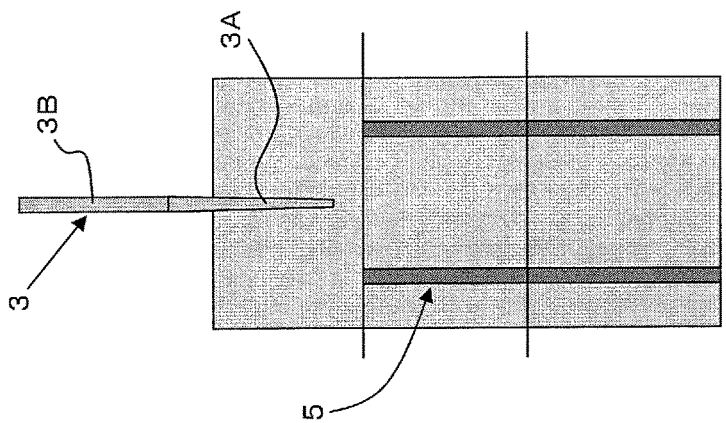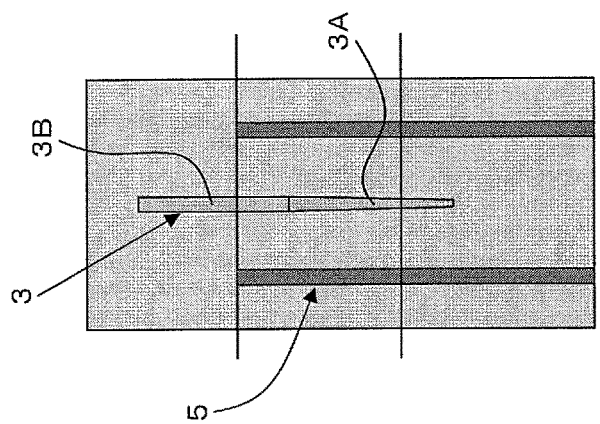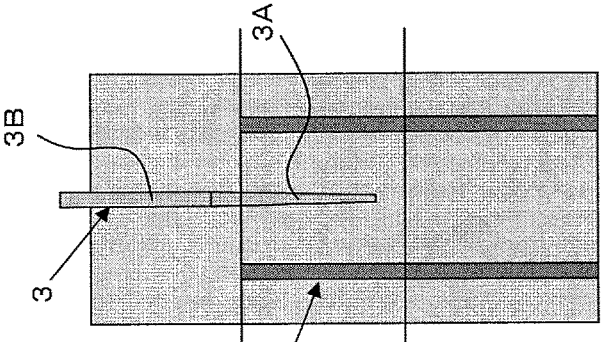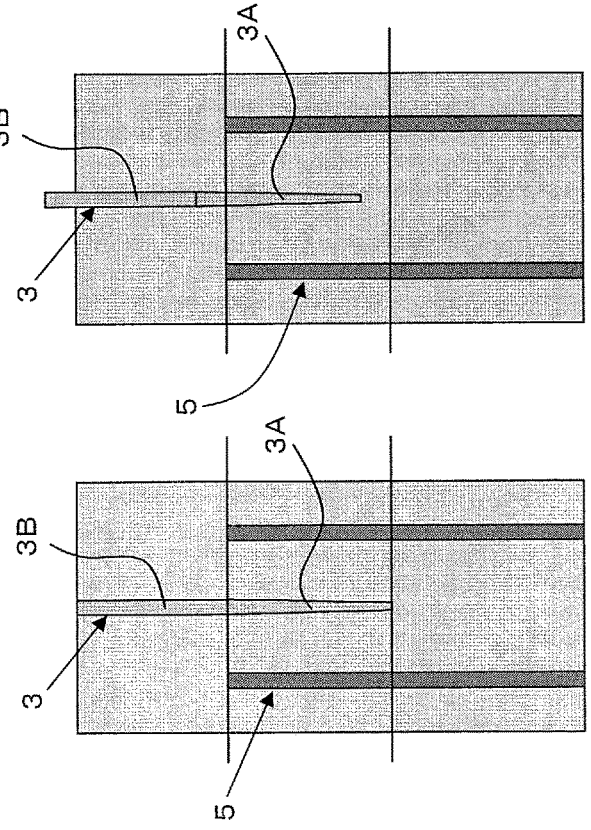

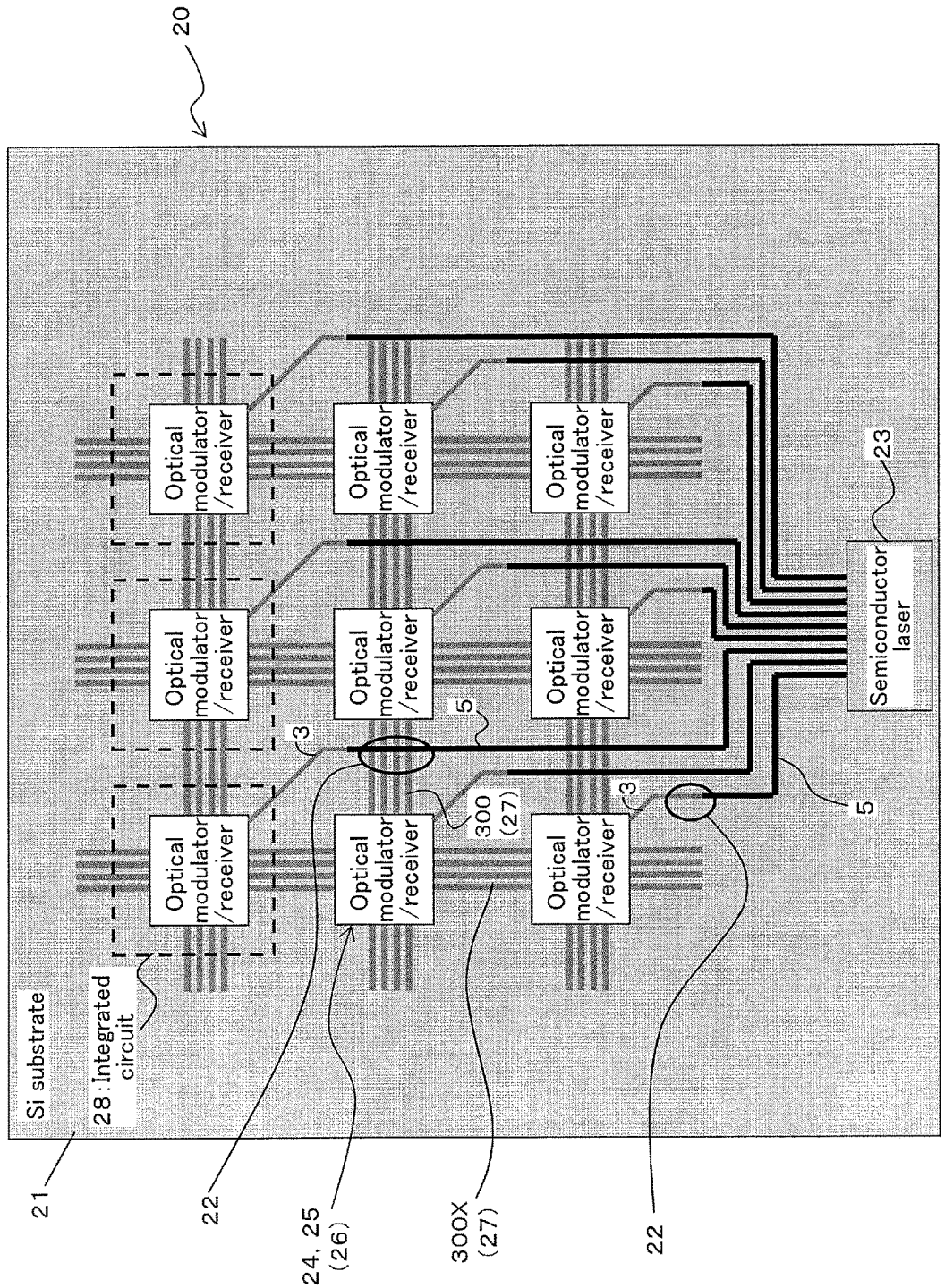

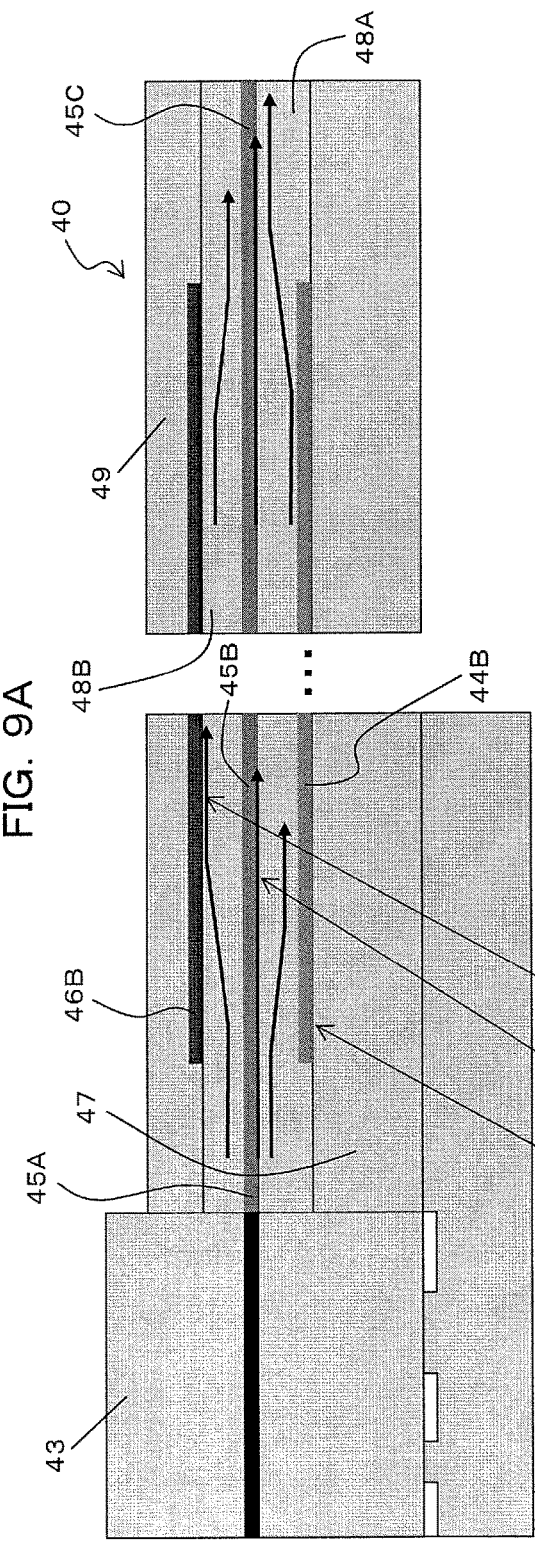
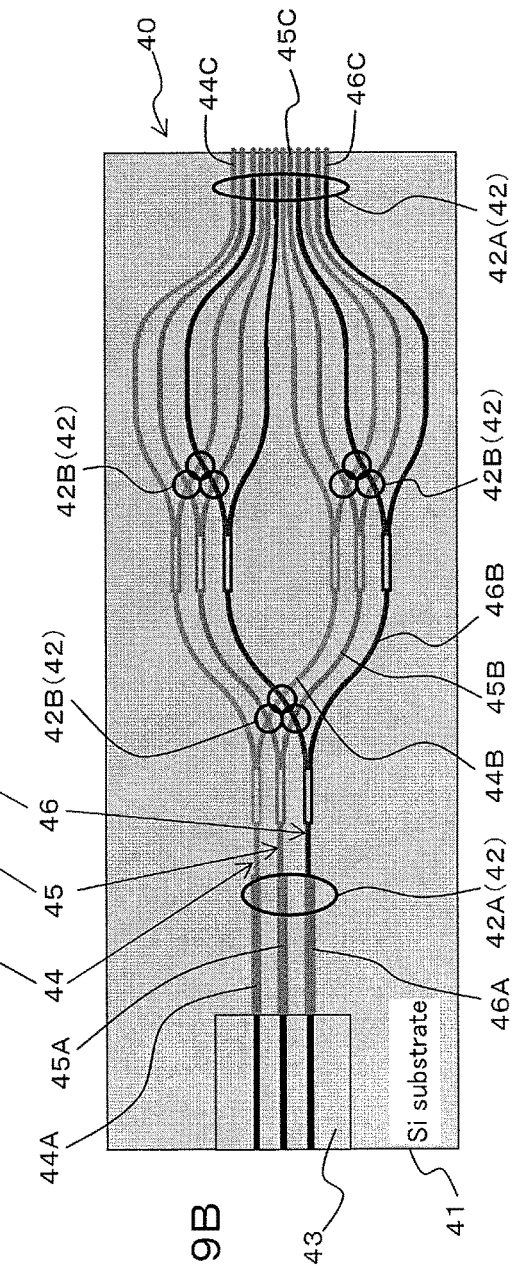
FIG. 9A
FIG. 9B

OPTICAL WAVEGUIDE, OPTICAL INTERPOSER AND LIGHT SOURCE

CROSS-REFERENCE TO RELATED APPLICATION

This application is based upon and claims the benefit of priority of the prior Japanese Patent Application No. 2013-027473, filed on Feb. 15, 2013, the entire contents of which are incorporated herein by reference.

FIELD

The embodiments discussed herein are related to an optical waveguide, an optical interposer and a light source.

BACKGROUND

While the demand for increase in capacity and speed of data processing is increasing, a higher-density optical signal processing circuit is being requested.

While a planar optical circuit (PLC; Planar Lightwave Circuit) for which a silica glass-based material is used is conventionally used, in recent years, research and development of a technology for forming an optical circuit on an SOI (Silicon on Insulator) substrate by practically applying a silicon (Si) wire waveguide processing technology is proceeding.

In the technology for forming an optical circuit on an SOI substrate, an Si core is frequently covered with a $SiO_2$ cladding layer to form an optical waveguide, and since the difference in refractive index between Si and $SiO_2$ is great, light can be confined in a higher efficiency in the Si core. Therefore, an optical waveguide array having a small distance or a curved optical waveguide having low optical loss can be formed, and optical waveguides can be formed in a high density.

Further, in order to avoid crossing of optical waveguides in a plane to reduce the loss, also a three-dimensional cross waveguide that implements a three-dimensional cross has been proposed. In the three-dimensional cross waveguide, one core having a taper region, which has a size that decreases toward a tip end thereof, is provided on a certain plane, and another core having a taper region, which has a size that decreases toward a tip end thereof, is provided on another plane having a distance from a substrate different from that of the one plane such that a tip end thereof opposes to that of the taper region of the one core so that propagation light is shifted in the heightwise direction.

SUMMARY

According to an aspect of the embodiment, an optical waveguide includes a substrate, a first core provided over the substrate and having a first taper region that extends from one side toward the other side and has a sectional area that decreases toward the other side, and a plurality of second cores provided over the substrate and over or under the first core with a first cladding layer sandwiched therebetween and extending in parallel to the substrate and the first core.

According to an aspect of the embodiment, an optical interposer includes a substrate, an optical waveguide provided on the substrate, an optical modulator provided on the substrate, and an optical detector provided on the substrate, the optical waveguide being configured in such a manner as described above.

According to an aspect of the embodiment, a light source includes a substrate, an optical waveguide provided on the substrate, and a light emitter provided on the substrate, the optical waveguide being configured in such a manner as described above.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 2 is a schematic perspective view depicting a particular example of a configuration of the optical waveguide according to the present embodiment and a light intensity distribution at various locations;

FIG. 3A is a schematic sectional view depicting a configuration of a modification to the particular configuration example of the optical waveguide according to the present embodiment and FIG. 3B is a schematic perspective view depicting a configuration of the modification to the particular configuration example of the optical waveguide according to the present embodiment and a light intensity distribution at various locations;

FIGS. 5A to 5D are schematic top plan views depicting a configuration of modifications to the particular configuration example of the optical waveguide according to the present embodiment;

FIG. 8 is a schematic top plan view depicting a configuration of an optical interposer according to the present embodiment; and FIGS. 9A and 9B are schematic views depicting a configuration of a light source according to the present embodiment, wherein FIG. 9A is a side elevational view and FIG. 9B is a top plan view.

DESCRIPTION OF EMBODIMENTS

However, in the three-dimensional cross waveguide described above, the core width of the taper regions of the one core and the other core is controlled with high accuracy in order to reduce the waveguide loss (propagation loss), and, if the core width is excessively great or small, then the waveguide loss increases. Therefore, it is difficult to increase the fabrication yield while the waveguide loss is reduced.

Therefore, it is desired to increase, in three-dimensional propagation of propagation light, the fabrication yield while the waveguide loss is reduced.

In the following, an optical waveguide, an optical interposer and a light source according to an embodiment are described with reference to FIGS. 1 to 9B.

The optical waveguide according to the present embodiment is used in an optical interconnect on an Si substrate, for example, an optical interconnect between boards, between chips or in a chip and in a field of optical fiber communications and so forth.

Figure 1:
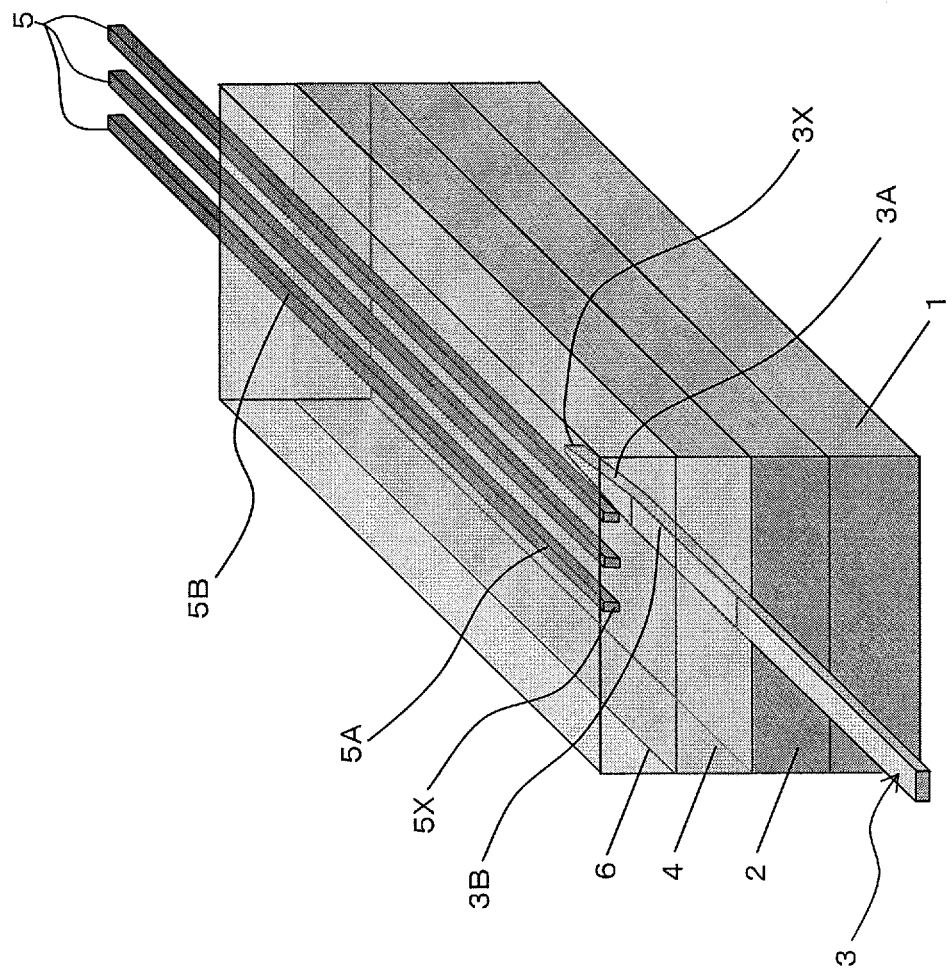
FIG. 1 is a schematic perspective view depicting a configuration of an optical waveguide according to an embodiment.

As depicted in FIG. 1, the present optical waveguide includes a substrate 1, a lower cladding layer 2, a lower core 3 provided on the lower cladding layer 2, an intermediate cladding layer 4 provided on the lower cladding layer 2 and the lower core 3, a plurality of upper cores 5 provided on the intermediate cladding layer 4 and an upper cladding layer 6 provided on the intermediate clad 4 and the upper cores 5. It is to be noted that the optical waveguide in a case in which three upper cores 5 are provided as the plurality of upper cores 5 is depicted in FIG. 1.

It is to be noted that the lower core 3 is referred to also as first core. Further, the upper cores 5 are each referred to also as second core. Further, the lower cladding layer 2 is referred to also as first cladding layer. Further, the intermediate cladding layer 4 is referred to also as second cladding layer. Further, the upper cladding layer 6 is referred to also as third cladding layer.

Here, the substrate 1 is a silicon (Si) substrate (semiconductor substrate). Meanwhile, the lower cladding layer 2, intermediate cladding layer 4 and upper cladding layer 6 are individually an $SiO_2$ cladding layer. Further, the lower core 3 is an Si core. Further, the upper core 5 is an SiN core. In the present embodiment, an SOI substrate including a BOX (Buried Oxide) layer that is an $SiO_2$ layer and an SOI layer that is an Si layer on the Si substrate 1 is used, and the SOI layer is etched such that the Si core as the lower core 3 is formed on the $SiO_2$ layer (BOX layer) as the lower cladding layer 2 from the SOI layer remaining by the etching. Further, the $SiO_2$ layer (BOX layer) as the lower cladding layer 2 and the Si core as the lower core 3 are covered with the $SiO_2$ layer as the intermediate cladding layer 4, and a plurality of SiN cores as the upper cores 5 are formed on the $SiO_2$ layer as the intermediate cladding layer 4 such that the Si core 3 is positioned between the SiN cores 5 as viewed from above, namely, between the two SiN cores 5 positioned on the most outer sides in a leftward and rightward direction from among the plurality of the SiN cores 5. Further, the $SiO_2$ layer as the intermediate cladding layer 4 and the plurality of SiN cores as the upper cores 5 are covered with the $SiO_2$ layer as the upper cladding layer 6. It is to be noted that the refractive index of SiN is lower than that of Si and proximate to that of $SiO_2$. Therefore, an upper optical waveguide configured from the intermediate cladding layer 4, upper cores 5 and upper cladding layer 6 has a lower refractive index difference than that of a lower optical waveguide configured from the lower cladding layer 2, lower core 3 and intermediate cladding layer 4.

Further, the Si core that is the lower core 3 extends from one side (near side in FIG. 1) and includes a terminal portion 3X, a taper region 3A having a sectional area that decreases toward the terminal portion 3X and a fixed sectional area region 3B contiguous to one side of the taper region 3A and having a fixed sectional area. In particular, the Si core that is the lower core 3 is provided over the substrate 1 and extends from one side to the other side, and includes the taper region 3A having a sectional area that decreases toward the other side. It is to be noted that the terminal portion 3X is referred to also as first terminal portion. Further, the taper region 3A is referred to also as first taper region. Meanwhile, the fixed sectional area region 3B is referred to also as first fixed sectional area region. Further, the sectional area is an area of a cross section perpendicular to a direction extending from the one side to the other side. Here, the taper region 3A is a width taper region having a width that decreases toward the terminal portion 3X. Further, the fixed sectional area region 3B is a region (fixed width region; fixed height (thickness) region) having a fixed width and a fixed height (thickness). It is to be noted that, since the Si core 3 has a sectional area that first increases toward a direction away from the terminal portion 3X and then is fixed, the size of the sectional area of the fixed sectional area region 3B is equal to that of the sectional area of a portion of the taper region 3A at which the sectional area is in the maximum.

It is to be noted that, when light is inputted from the one side (near side in FIG. 1), the light is outputted from the opposite side (remote side; the other side in FIG. 1) to the one side, but when light is outputted from the one side, the light is inputted from the opposite side to the one side.

Further, the plurality of SiN cores 5 as the plurality of upper cores are provided over the Si core 3 with the intermediate cladding layer 4 sandwiched therebetween, and extend in parallel to each other from the one side toward the opposite side to the one side including a region corresponding to the taper region 3A of the Si core 3. In particular, the plurality of SiN cores 5 as the plurality of upper cores are provided over the substrate 1 and over the Si core 3 with the intermediate cladding layer 4 sandwiched therebetween and extend in parallel to the substrate 1 and the Si core 3. In this case, the two SiN cores 5 positioned at the most outer sides in the leftward and rightward direction from among the plurality of SiN cores 5 are positioned on both of the left and right sides with respect to the Si core 3. Further, light propagating in the region (optical waveguide) including the plurality of SiN cores 5 forms a single optical mode (fundamental mode). In other words, the sizes of the plurality of SiN cores 5 and the distance between the plurality of SiN cores 5 are set such that light propagating in the region including the plurality of SiN cores 5 forms a single optical mode.

Further, it is preferable for the plurality of SiN cores 5 to individually include, on the one side, a taper region 5A having a sectional area that increases toward the opposite side to the one side and a fixed sectional area region 5B contiguous to the opposite side to the one side of the taper region 5A and having a fixed sectional area. It is to be noted that the taper region 5A is referred to also as second taper region. Further, the fixed sectional area region 5B is referred to also as second fixed sectional area region. Further, the sectional area is an area of a cross section perpendicular to a direction extending from the one side to the other side (opposite side to the one side). Here, the taper region 5A is a width taper region having a width that increases toward the opposite side to the one side. Further, the fixed sectional area region 5B is a region (fixed width region; fixed height (thickness) region) having a fixed width and a fixed height (thickness). It is to be noted here that, since the SiN cores 5 has a sectional area that first increases toward the opposite side to the one side and then is fixed, the size of the sectional area of the fixed sectional area region 5B is equal to that of the sectional area of a portion at which the sectional area is in the maximum in the taper region 5A.

Here, the plurality of SiN cores 5 individually extend from the one side of the taper region 3A of the Si core 3, namely, from a position corresponding to a boundary position between the taper region 3A and the fixed sectional area region 3B, toward the opposite side to the one side.

In this manner, the Si core 3 is structured such that the width thereof is fixed on the one side and reduces gently in a tapering shape along a propagation direction of light (light guiding direction) and is terminated at the narrowest location. Further, each of the plurality of SiN cores 5 is structure such that the width thereof is smallest at a tip end (terminal end) at a position corresponding to the region in which the width of the Si core 3 is fixed and increases gently in a tapering shape along the light propagation direction and then is largest at a location at which the Si core 3 ends and then is fixed.

In the optical waveguide configured in this manner, light propagates (is guided) in the following manner.

It is to be noted that description here is given taking a case in which light propagates from one side (near side in FIG. 1), namely, from the side of the region (waveguide) including the Si core 3, to the opposite side (remote side in FIG. 1) to the one side, namely, to the side of the region (waveguide) including the SiN cores 5, as an example.

Propagation light propagates as light of a single mode through the region including the Si core 3. Here, the Si core 3 is sized such that it has a width of, for example, approximately 450 nm in order to maintain the single mode of the propagation light. If this propagation light enters a region in which the region (waveguide) including the taper region 3A of the Si core 3 and the region (waveguide) including the plurality of SiN cores 5 overlap with each other, then the core width decreases along the propagation direction of light in the taper region 3A of the Si core 3. Therefore, the light leaks to increase the spot size and the mode of the light expands in the region including the taper region 3A of the Si core 3. Then, the light having the increased spot size, namely, the light of the expanded mode, is gradually coupled adiabatically to the plurality of SiN cores 5 by an influence of the plurality of SiN cores 5 provided over the Si core 3 with the intermediate cladding layer 4 sandwiched therebetween, namely, of the plurality of SiN cores 5 positioned upwardly by the thickness of the intermediate cladding layer 4 of one layer. In particular, as the intensity of light gradually couples adiabatically from the Si core 3 to the plurality of SiN cores 5, the light having propagated in the region including the Si core 3 is transferred to and propagates in the region including the plurality of SiN cores 5 in the overlapping region. In this manner, the propagation light is shifted in the heightwise (thicknesswise) direction from the region including the Si core 3 provided on the lower cladding layer 2 to the region including the plurality of SiN cores 5 provided over the Si core 3 with the intermediate cladding layer 4 sandwiched therebetween and propagates three-dimensionally (stereoscopically). In particular, the propagation light is shifted in the heightwise direction from the Si core 3 positioned at one position in the heightwise direction to the plurality of SiN cores 5 positioned at a different position in the heightwise direction at which the distance from the Si substrate 1 is different and propagates three-dimensionally. In this case, when the light propagates in the Si core 3 and the plurality of SiN cores 5, the propagation light propagates in a displaced relationship in the heightwise direction (upward and downward direction). At this time, the propagation light is gradually confined strongly in the region including the plurality of SiN cores 5 as the sectional area of the taper region 3A of the Si core 3 decreases. In other words, since the taper region 3A of the Si core 3 is provided in the overlapping region, the propagation light can be confined with certainty in the region including the plurality of SiN cores 5. Then, the propagation light propagates as single-mode light in the fixed sectional area region 5B of the plurality of SiN cores 5. Therefore, the present optical waveguide is referred to also as stereoscopic optical waveguide or stereoscopic waveguide mechanism. Since use of such a stereoscopic optical waveguide as described above makes it possible to allow light to propagate stereoscopically with low loss from a core on one layer to another core on a different layer (namely, from one optical interconnect layer to another optical interconnect layer), increase of the density by multi-layering of the optical interconnect layer can be implemented.

In this manner, with the present optical waveguide, propagation light can be propagated three-dimensionally while the single mode of the propagation light is maintained.

Here, as described above, the sizes of the plurality of SiN cores 5 and the distance between the plurality of SiN cores 5 are set such that the propagation light forms a single optical mode. In particular, the sizes of the plurality of SiN cores 5 and the distance between the plurality of SiN cores 5 may be set such that light is confined by the plurality of SiN cores 5 and the propagation light propagating in the region including the plurality of SiN cores 5 forms a single optical mode. For example, the distance between the two SiN cores 5 positioned on the most outer sides in the leftward and rightward direction from among the plurality of SiN cores 5 may be set to approximately 1 μm, and the size of each of the plurality of SiN cores 5 at the terminal end on the side on which the Si core 3 is provided may be set so as to have a width of approximately 300 nm and a height (thickness) of approximately 300 nm. Consequently, the propagation light propagates as single-mode light in the region including the plurality of SiN cores 5. It is to be noted that, if the distance between the two SiN cores 5 positioned on the most outer sides in the leftward and rightward direction from among the plurality of SiN cores 5 is approximately 1 μm, then the propagation light propagating in the region including the plurality of SiN cores 5 forms a single optical mode. In this case, if the distance between the two SiN cores 5 positioned on the most outer side in the leftward and rightward direction from among the plurality of SiN cores 5 is set excessively great, then two waveguides independent of each other are formed in the regions including the two SiN cores 5 positioned on the most outer sides in the leftward and rightward direction from among the plurality of SiN cores 5 and the propagation light propagating in the region including the plurality of SiN cores 5 does not form a single optical mode any more. Further, if the size of each of the plurality of SiN cores 5 is set excessively great, then the propagation light propagating in the region including the plurality of SiN cores 5 does not form a single optical mode any more.

In this manner, by using the plurality of SiN cores 5 spaced from each other in the horizontal direction, the manufacturing tolerance of accuracy for the width of the core in the region in which the propagation light propagates three-dimensionally (namely, in the region in which light shifts between the layers) can be expanded. In particular, where the plurality of SiN cores 5 are used, the propagation light forms a single optical mode depending upon the sizes of the plurality of SiN cores 5 and the distance between the plurality of SiN cores 5. In this case, the influence of the processing accuracy of the width of each SiN core 5 on the coupling loss is lower than that of the processing accuracy of the distance between the SiN cores 5 on the coupling loss. Therefore, even if a manufacturing error occurs with the width of the plurality of SiN cores 5, the influence of this on the mode shape formed by the entire plurality of SiN cores 5 is low. The SiN cores 5 are obtained, for example, by forming an SiN film by plasma CVD and then processing the SiN film by EB lithography. The processing accuracy by the EB lithography is approximately ±10 nm. For example, where the distance between the two SiN cores 5 positioned on the most outer sides in the leftward and rightward direction from among the plurality of SiN cores 5 is set to approximately 1 μm as described above, the manufacturing error of approximately ±10 nm with respect to the distance of approximately 1 μm is small. Further, even if some manufacturing error occurs with the size of the SiN cores 5 having the width and the height of approximately 300 nm, the influence of this on the mode shape formed by the entire plurality of SiN cores 5 is low. Accordingly, the manufacturing tolerance of accuracy for the width of the core in the region in which propagation light propagates three-dimensionally can be expanded. In other words, while the propagation loss (waveguide loss) is decreased, the fabrication yield can be improved and the cost can be decreased.

It is to be noted that the Si core 3 is formed by processing an Si layer on the surface of an SOI substrate, for example, by EB lithography. Here, the processing accuracy by the EB lithography is approximately ±10 nm. The $SiO_2$ layer as the intermediate cladding layer 4 and the upper cladding layer 6 is formed, for example, by plasma CVD. The SiN cores 5 are formed, for example, by forming a film by plasma CVD and then processing the formed film by EB lithography. Here, the processing accuracy by the EB lithography is approximately ±10 nm.

In this manner, the optical waveguide configured in such a manner as described above makes it possible to provide an optical waveguide that can be applied to an optical waveguide (optical circuit) by Si microfabrication and can be fabricated with low waveguide loss, at a low cost and in high controllability.

A particular example of the configuration is described below.

First, a particular configuration example is described with reference to FIG. 2.

In the optical waveguide of the particular configuration example, as depicted in FIG. 2, the central one of the three SiN cores 5 in the embodiment described above is displaced in a direction away from the Si core 3 while the two SiN cores 5 on both of the left and right sides with respect to the central SiN core 5 have a taper region 5C contiguous to the opposite side to the one side of the fixed sectional area region 5B and having a sectional area that decreases toward the opposite side to one side. It is to be noted that the taper region 5C is referred to also as third taper region. Further, the sectional area is an area of a cross section perpendicular to a direction extending from the one side to the other side (opposite side to the one side).

In this case, the two SiN cores 5 on both of the left and right sides are provided as the plurality of SiN cores 5 in the embodiment described above, and light propagating in a region including the two SiN cores 5 forms a single optical mode. In other words, the sizes of the two SiN cores 5 and the distance between the two SiN cores 5 are set such that light propagating in the region including the two SiN cores 5 forms the single optical mode.

Further, one different SiN core 50 that extends in parallel to the two SiN cores 5 and to which propagation light does not propagate three-dimensionally from the Si core 3 is provided separately between the two SiN cores 5. The different SiN core 50 extends from the one side to the opposite side to the one side including a region corresponding to the taper region 5C provided on the opposite side to the one side of the two SiN cores 5 provided on both sides of the SiN core 50 with the SiN core 50 sandwiched therebetween. Further, the different SiN core 50 includes a taper region 50A having, on the one side, a sectional area that increases toward the opposite side to the one side and a fixed sectional area region 50B contiguous to the opposite side to the one side of the taper region 50A and having a fixed sectional area. In particular, the different SiN core 50 is provided over the substrate 1 and has the taper region 50A extending from the other side toward the one side and having a sectional area that decreases toward the one side. It is to be noted that the different SiN core 50 is referred to also as third core. Further, the taper region 50A is referred to also as fourth taper region. Further, the fixed sectional area region 50B is referred to also as third fixed sectional area region. Further, the sectional area is an area of a cross section perpendicular to the direction extending from the one side to the other side (opposite side to the one side). Here, the taper region 50A is a width taper region having a width that increases toward the opposite side to the one side. Further, the fixed sectional area region 50B is a region (fixed width region; fixed height (thickness) region) having a fixed width and a fixed height (thickness). It is to be noted here that, since the different SiN core 50 has a sectional area that first increases toward the opposite side to the one side and then is fixed, the size of the sectional area of the fixed sectional area region 50B is equal to that of the sectional area at a location at which the sectional area is maximum in the taper region 50A.

Here, the two SiN cores 5 on both of the left and right sides extend to the opposite side to the one side of the taper region 50A of the one different SiN core 50, namely, a position corresponding to the boundary position between the taper region 50A and the fixed sectional area region 50B or the opposite side to the one side farther than the position and are terminated. In this case, the two SiN cores 5 on both of the left and right sides extend from the position corresponding to the fixed sectional area region 50B of the one different SiN core 50 toward the one side. Further, the one different SiN core 50 extends from the other side being the opposite side to the one side to the one side of the taper region 5C of the two SiN cores 5 on both of the left and right sides, namely, to a position corresponding to the boundary position between the taper region 5C and the fixed sectional area region 5B or to the one side farther than the position and is terminated. In this case, the one different SiN core 50 extends from the position corresponding to the fixed sectional area region 5B of the two SiN cores 5 on both of the left and right sides toward the opposite side to the one side. It is to be noted that preferably the taper region 50A (region having a sectional area that increases from the one side toward the other side) of the one different SiN core 50 is provided at the position corresponding to the taper region 5C (region having a sectional area that decreases from the one side toward the other side) of the two SiN cores 5.

Therefore, the optical waveguide of the particular configuration example includes the first core 3 extending from the one side and having a first terminal portion 3X and the first taper region 3A having a sectional area that decreases toward the first terminal portion 3X and the plurality of second cores 5 provided over or under the first core 3 with the first cladding layer 4 sandwiched therebetween and extending in parallel to each other from the one side toward the opposite side to the one side including the region corresponding to the first taper region 3A. Further, in the optical waveguide in which light propagating in the region including the plurality of second cores 5 forms a single optical mode, the two second cores having, on the opposite side to the one side, the third taper region 5A having a sectional area that decreases toward the opposite side and the fixed sectional area region 5B contiguous to the one side of the third taper region 5A and having a fixed sectional area are provided as the plurality of second cores 5. Further, the third core 50 provided between the two second cores 5 and having the fourth taper region 50A having, on the one side, a sectional area that increases toward the opposite side to the one side and the third fixed sectional area region 50B contiguous to the opposite side to the one side of the fourth taper region 50A and having a fixed sectional area is provided.

In the optical waveguide configured in this manner, similarly as in the case of the embodiment described hereinabove, propagation light is shifted in a heightwise (thicknesswise) direction from the region including the Si core 3 provided on the lower cladding layer 2 to the region including the two SiN cores 5 provided over the Si core 3 with the intermediate cladding layer 4 sandwiched therebetween and then propagates three-dimensionally. Thereafter, the light propagated as light of the single optical mode in the region including the two SiN cores 5 provided on the intermediate cladding layer 4 is shifted in an in-plane direction and the propagates two-dimensionally (planarly) from the region including the two SiN cores 5 to the region including the one different SiN core 50 provided between the two SiN cores 5 on the intermediate cladding layer 4 and then propagates as light of the single mode in the fixed sectional area region 50B of the one different SiN core 50.

In this manner, with the optical waveguide of the particular configuration example, propagation light can be propagated three-dimensionally while a single mode of the propagation light is maintained. Further, the propagation light can be propagated two-dimensionally from the region including the two SiN cores 5 to the region including the one different SiN core 50. Since the propagation light propagates two-dimensionally from the region including the two SiN cores 5 to the region including the one different SiN core 50 in this manner, the propagation loss (waveguide loss) can be reduced from that in an alternative case in which the propagation light propagates as light of a single optical mode in the region including the two SiN cores 5.

It is to be noted that, while the one different SiN core 50 may be configured so as to extend in one direction, it may otherwise include a partially curved portion.

Here, as described above, the distance between (the centers of) the two SiN cores 5 may be set to approximately 1 µm while the two SiN cores 5 at the terminal end on the side on which the Si core 3 is provided are dimensioned such that they have a width of approximately 300 nm and a height (thickness) of approximately 300 nm. By the configuration just described, propagation light propagates as single mode light in the region including the two SiN cores 5. Further, the two SiN cores 5 may include the taper region 5C having a minimum width of approximately 300 nm at the terminal end thereof on the side on which the one different SiN core 50 is provided, a maximum width of approximately 400 nm and a length of approximately 80 µm. Meanwhile, the one different SiN core 50 may include the taper region 50A having a minimum width of approximately 300 nm at the terminal end thereof on the side on which the two SiN cores 5 are provided, a maximum width of approximately 400 nm and a length of approximately 80 µm. By the configuration just described, light having propagated in the region including the two SiN cores 5 is shifted in an in-plane direction and then propagates as single mode light in the region including the one different SiN core 50.

The dimensions of the optical waveguide of the particular configuration example may be further set as specified below.

An SOI substrate having a BOX layer ($SiO_2$ layer) of a thickness of approximately 2 µm and an SOI layer (Si layer) of a thickness of approximately 220 nm on the Si substrate 1 is used. Therefore, the thickness of the $SiO_2$ layer as the lower cladding layer 2 is approximately 2 µm and the thickness of the Si core as the lower core 3 is approximately 220 nm. Further, the Si core as the lower core 3 has the taper region 3A having a minimum width of approximately 100 nm at the terminal end (tip end) thereof, a maximum width of approximately 450 nm and a length of approximately 80 µm, and the fixed sectional area region 3B having a width of approximately 450 nm. Further, the thickness of the $SiO_2$ layer as the intermediate cladding layer 4 is set to approximately 1 µm. Further, the two SiN cores 5 individually have, in addition to the taper region 5C described above, the taper region 5A having a minimum width of approximately 300 nm at the terminal end thereof on the side on which the Si core 3 is provided, a maximum width of approximately 400 nm and a length of approximately 80 µm, and the fixed sectional area region 5B having a width of approximately 400 nm. Further, the one different SiN core 50 has, in addition to the taper region 50A described above, the fixed sectional area region 50B having a width of approximately 400 nm. It is to be noted that the height (thickness) of the two SiN cores 5 and the one different SiN core 50 is fixed along the overall length of them and is approximately 300 nm. Further, the thickness of the $SiO_2$ layer as the upper cladding layer 6 is approximately 1 µm. It is to be noted that the taper region is referred to also as taper region having a size that decreases toward a tip end thereof.

In this manner, the Si core 3 has a width that is greatest on the one side and is fixed first, decreases gently in a taper shape along the propagation direction (waveguide direction) of light and is smallest at a position corresponding to the region in which the width of the two SiN cores 5 is greatest, and the Si core 3 is terminated at the position. Meanwhile, the two SiN cores 5 have a width that is smallest at the tip end at a position corresponding to the region in which the width of the Si core 3 is greatest, increases gently in a taper shape toward the light propagation direction, is greatest after the Si core 3 ends and then is fixed. Further, the width of the two SiN cores 5 decreases gently in a taper shape toward the light propagation direction and is smallest at a position corresponding to the region in which the width of the one different SiN core 50 is greatest, and the two SiN cores 5 are terminate at the position. Further, the one different SiN core 50 is provided at a central position between the two SiN cores 5. The SiN core 50 has a width that is smallest at the tip end thereof at a position corresponding to the region in which the width of the two SiN cores 5 is greatest, increases gently in a taper shape toward the light propagation direction, is greatest after the two SiN cores 5 end, and then is fixed.

Then, in the optical waveguide configured in this manner, propagation light propagates (is guided) three-dimensionally from the region including the Si core 3 to the region including the two SiN cores 5 while the mode shape changes gently and then propagates (is guided) in a plane from the region including the two SiN cores 5 to the region including the one different SiN core 50 while the mode shape changes gently.

Here, FIG. 2 depicts a result of calculation of the light intensity distribution (mode profile) at several locations of such an optical waveguide as described above in contour lines. It is to be noted that, in the light intensity distribution depicted in FIG. 2, the light intensity on a contour line on the inner side is higher than that on a contour line on the outer side. Further, light intensity distributions on a cross section perpendicular to the extending direction of the optical waveguide are depicted.

Light have propagated as single mode light in the region including the Si core 3 is gradually optically coupled from the Si core 3 to the two SiN cores 5 in the region in which the Si core 3 and the two SiN cores 5 overlap with each other. Then, a light intensity distribution of a unimodal shape at a location indicated by an arrow mark of reference character A in FIG. 2 into light having a light intensity distribution is converted into a light intensity distribution having a peak of light propagating in the Si core 3 and a multimodally-shaped (three-modally-shaped) peak of light propagating in the plurality of SiN cores 5 in a location depicted by an arrow mark of reference character B in FIG. 2. Thereafter, the light having propagated as the single mode light in the region including the two SiN cores 5 is gradually optically coupled from the two SiN cores 5 to the one different SiN core 50 in the region in which the one different SiN core 50 is provided between the two SiN cores 5 and is gradually confined into the one different SiN core 50. Then, a bimodally-shaped light intensity distribution at a location depicted by an arrow mark of reference character C in FIG. 2 is converted into a unimodally-shaped light intensity distribution at a location indicated by an arrow mark of reference character D in FIG. 2. It is to be noted that the location indicated by the arrow mark of reference character C is a location at which the sectional area of the two SiN cores 5 is greatest, namely, the fixed sectional area region 5B.

It is to be noted that, where the optical mode profile has contour lines indicating a plurality of peaks and further has a contour line or lines that surround the plurality of peaks like an optical mode profile at the location indicated by the reference character B in FIG. 2, light propagating in the region including the plurality of SiN cores 5 and the Si core 3 forms a single optical mode. On the other hand, where the optical mode profile has contour lines indicating a plurality of peaks and further has a contour line or lines that surround the plurality of peaks like an optical mode profile at the location indicated by the reference character C as in FIG. 2, light propagating in the region including the plurality of SiN cores 5 forms the single optical mode. In other words, light propagating in the region including the plurality of SiN cores 5 forms a single optical mode having an intensity peak in the plurality of SiN cores 5.

It is to be noted that, while a discontinuous point at which appearance or disconnection of a core occurs appears in such an optical waveguide as described above, if such a configuration and setting in dimension as described above are applied, then an optical waveguide can be implemented in which excessive loss by mode mismatch at a discontinuous point can be suppressed to approximately 0.01 dB or less and waveguide loss is low.

Incidentally, while the two SiN cores 5 in the embodiment and the particular configuration example described above are positioned on both of the left and right sides with respect to the Si core 3, the present invention is not limited to this and one of the two SiN cores 5 may be positioned just over or just under the Si core 3. In particular, as viewed from above, the Si core 3 may be sandwiched between the two SiN cores 5, or one of the two SiN cores 5 may be positioned just over or just under the Si core 3 while the other one of the two SiN cores 5 is positioned in a spaced relationship in a horizontal direction (leftward or rightward directions) from the one of the two SiN cores 5.

For example, in the particular configuration example described above, it is described that propagation light propagates (is guided) three-dimensionally while the mode shape thereof changes gently and propagates as light of a single mode taking the case in which the Si core 3 is disposed under the central position between the two SiN cores 5 as an example. However, for example, even if the position of the two SiN cores 5 with respect to the Si core 3 is displaced by approximately 0.5 μm in the leftward or rightward direction (horizontal direction) until the Si core 3 is positioned under one of the two SiN cores 5 as depicted in FIG. 3A, propagation light propagates (is guided) three-dimensionally while the mode shape changes gradually and propagates as single mode light as depicted in FIG. 3B. In particular, the unimodally-shaped light intensity distribution at the location indicated by the arrow mark of reference character A in FIG. 3B is converted into a multimodally-shaped (three-modally-shaped) light intensity distribution at the location indicated by reference characters B to D in FIG. 3B and then into a bimodally-shaped light intensity distribution at the location indicated by reference character E in FIG. 3B. It is to be noted that, in the light intensity distribution (mode profile) depicted in FIG. 3B, the light intensity on a contour line on the inner side is higher than that on a contour line on the outer side. Further, the light intensity distribution in a cross section perpendicular to an extending direction of the optical waveguide is depicted. FIG. 3A is a sectional view taken along line A-A' of FIG. 3B. However, in regard to a point that a surplus mode is less likely to excite, it is preferable to provide the two SiN cores 5 so as to be positioned on both of the left and right sides with respect to the Si core 3 as in the particular configuration example described above, and it is more preferable to provide the Si core 3 so as to be positioned at the central position between the two SiN cores 5 as viewed from above.

Accordingly, with the optical waveguide according to the present embodiment, there is an advantage that the propagation loss (waveguide loss) when propagation light is propagated three-dimensionally is reduced and the fabrication yield can be improved.

It is to be noted that the present invention is not limited to the configurations described in the description of the embodiment and the particular configuration example and the modification thereto, but they can be modified in various manners without departing from the scope of the present invention.

Figures 4A, 4B, 4C, 4D:
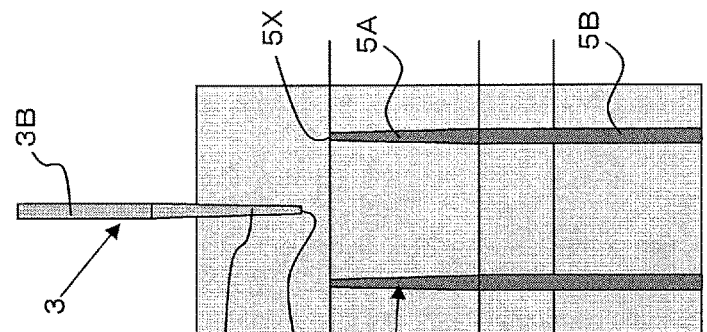
FIGS. 4A to 4D are schematic top plan views depicting a configuration of modifications to the particular configuration example of the optical waveguide according to the present embodiment.

For example, in the embodiment (including the particular configuration example) and the modification thereto described above, in order to reduce the loss upon transition between the upper and lower cores, for example, while the terminal positions of the plurality of SiN cores 5 are set so as to coincide with the boundary position between the taper region 3A and the fixed sectional area region 3B of the Si core 3 and the terminal position of the Si core 3 is set so as to coincide with the boundary position between the taper region 5A of the plurality of SiN cores 5 and the fixed sectional area region 5B as depicted in FIG. 4A, the present invention is not limited to this. In particular, while the plurality of SiN cores 5 extend from the position corresponding to the fixed sectional area region 3B of the Si core 3 toward the other side and the Si core 3 extends from the position corresponding to the fixed sectional area region 5B of the SiN core 5 toward the one side, the present invention is not limited to this. For example, the optical waveguides may be provided such that the terminal position of the plurality of SiN cores 5 is displaced from the boundary position between the taper region 3A and the fixed sectional area region 3B of the Si core 3 and the terminal end portion 5X is positioned in the region corresponding to the taper region 3A of the Si core 3 and besides the terminal position of the Si core 3 is displaced from the boundary position between the taper region 5A and the fixed sectional area region 5B of the plurality of SiN cores 5 such that the terminal end portion 3X of the Si core 3 is positioned in the region corresponding to the taper region 5A of the plurality of SiN cores 5 as depicted in FIG. 4B. Further, for example, the optical waveguides may be provided such that the terminal positions of the plurality of SiN cores 5 are displaced from the boundary position between the taper region 3A and the fixed sectional area region 3B of the Si core 3 such that the terminal end portion 5X of the plurality of SiN cores 5 is positioned in the region corresponding to the fixed sectional area region 3B of the Si core 3 and besides the terminal position of the Si core 3 is displaced from the boundary position between the taper region 5A and the fixed sectional area region 5B of the plurality of SiN cores 5 such that the terminal end portion 3X of the Si core 3 is positioned in the region corresponding to the fixed sectional area region 5B of the plurality of SiN cores 5 as depicted in FIG. 4C. However, where the loss upon transition between the upper and lower cores is compared with those of the embodiment (including the particular configuration example) and the modification to the embodiment described above, it is high.

Further, while, in the embodiment (including the particular configuration example) and the modification thereto described above, the region including the plurality of SiN cores 5 and the region including the Si core 3 overlap with each other, the present invention is not limited to this. For example, the region including the plurality of SiN cores 5 and the region including the Si core 3 may be displaced from each other along the light propagation direction, namely, the plurality of SiN cores 5 and the Si core 3 may be displaced from each other along the light propagation direction, as depicted in FIG. 4D, such that the region including the plurality of SiN cores 5 and the region including the Si core 3 do not overlap with each other so that light is propagated from the region including the plurality of SiN cores 5 to the region including the Si core 3. In this case, the plurality of SiN cores 5 and the Si core 3 are provided so that light is coupled from the plurality of SiN cores 5 to the Si core 3. However, where the loss upon transition between the upper and lower cores is compared with those of the embodiment (including the particular configuration example) and the modification to the embodiment described above, it is high.

Further, while, in the embodiment described above, the plurality of SiN cores 5 include the taper region 5A on the one side, namely, on the side on which the Si core 3 is provided, in order to reduce the loss upon transition between the upper and lower cores, the present invention is not limited to this and the sectional area may be fixed along the overall length of the plurality of SiN cores 5 without providing the taper region on the plurality of SiN cores 5. Similarly, while, in the particular configuration example of the embodiment and the modification thereto described above, the two SiN cores 5 include the taper region 5A on the one side, namely, on the side on which the Si core 3 is provided, in order to reduce the loss upon transition between the upper and lower cores, the present invention is not limited to this and the sectional area may be fixed without providing the taper region on the one side. This is because, since the refractive index of the SiN core 5 is lower than that of the Si core 3 and is proximate to that of the cladding layer (SiO₂), light in the SiN core 5 is likely to leak to the outer side of the core and is likely to transit to the Si core 3.

However, where the loss upon transition between the upper and lower cores is compared with those of the embodiment (including the particular configuration example) and the modification thereto described above, the loss is high. In this case, for example, it is preferable to set the boundary position between the taper region 3A and the fixed sectional area region 3B of the Si core 3 so as to coincide with the terminal position of the SiN core 5 as depicted in FIG. 5A. However, for example, although loss is likely to occur in comparison with that in the configuration just described, the boundary position between the taper region 3A and the fixed sectional area region 3B of the Si core 3 may be set so as not to coincide with the terminal position of the SiN core 5 as depicted in FIGS. 5B to 5D. In particular, for example, the SiN core 5 may be set so as to terminate at the position corresponding to the taper region 3A of the Si core 3 as depicted in FIG. 5B, or, for example, the SiN core 5 may be set so as to terminate at the position corresponding to the fixed sectional area region 3B of the Si core 3 as depicted in FIG. 5C. In other words, for example, the boundary position between the taper region 3A and the fixed sectional area region 3B of the Si core 3 may be set so as not to overlap with the SiN core 5 as depicted in FIG. 5B, or, for example, the boundary position between the taper region 3A and the fixed sectional area region 3B of the Si core 3 may be set so as to overlap with the SiN core 5 as depicted in FIG. 5C. Further, while, for example, in FIGS. 5A to 5C, the Si core 3 and the SiN core 5 overlap with each other, for example, the Si core 3 and the SiN core 5 may be displaced from each other along the light propagation direction so that the Si core 3 and the SiN core 5 do not overlap with each other as depicted in FIG. 5D.

Further, while, in the embodiment, particular configuration example and modification to the embodiment described above, the SiN cores 5 as the plurality of upper cores are provided over the Si core 3 as the one lower core with the cladding layer 4 sandwiched therebetween, the present invention is not limited to this and, for example, the Si core as the one upper core may be provided over the SiN cores 5 as the plurality of the lower cores with the cladding layer sandwiched therebetween. While, in particular, the plurality of SiN cores 5 in the embodiment described above are provided over the Si core 3 with the cladding layer 4 sandwiched therebetween, the present invention is not limited to this and the plurality of SiN cores 5 may be provided under the Si core with the cladding layer sandwiched therebetween.

Further, while, for example, in the embodiment (refer to FIG. 1) described above, light is propagated as single mode light in the waveguide including the plurality of SiN cores 5 of the upper layer after the light is propagated three-dimensionally from the waveguide including the Si core 3 of the lower layer to the waveguide including the plurality of SiN cores 5 of the upper layer, the present invention is not limited to this.

Figure 6:
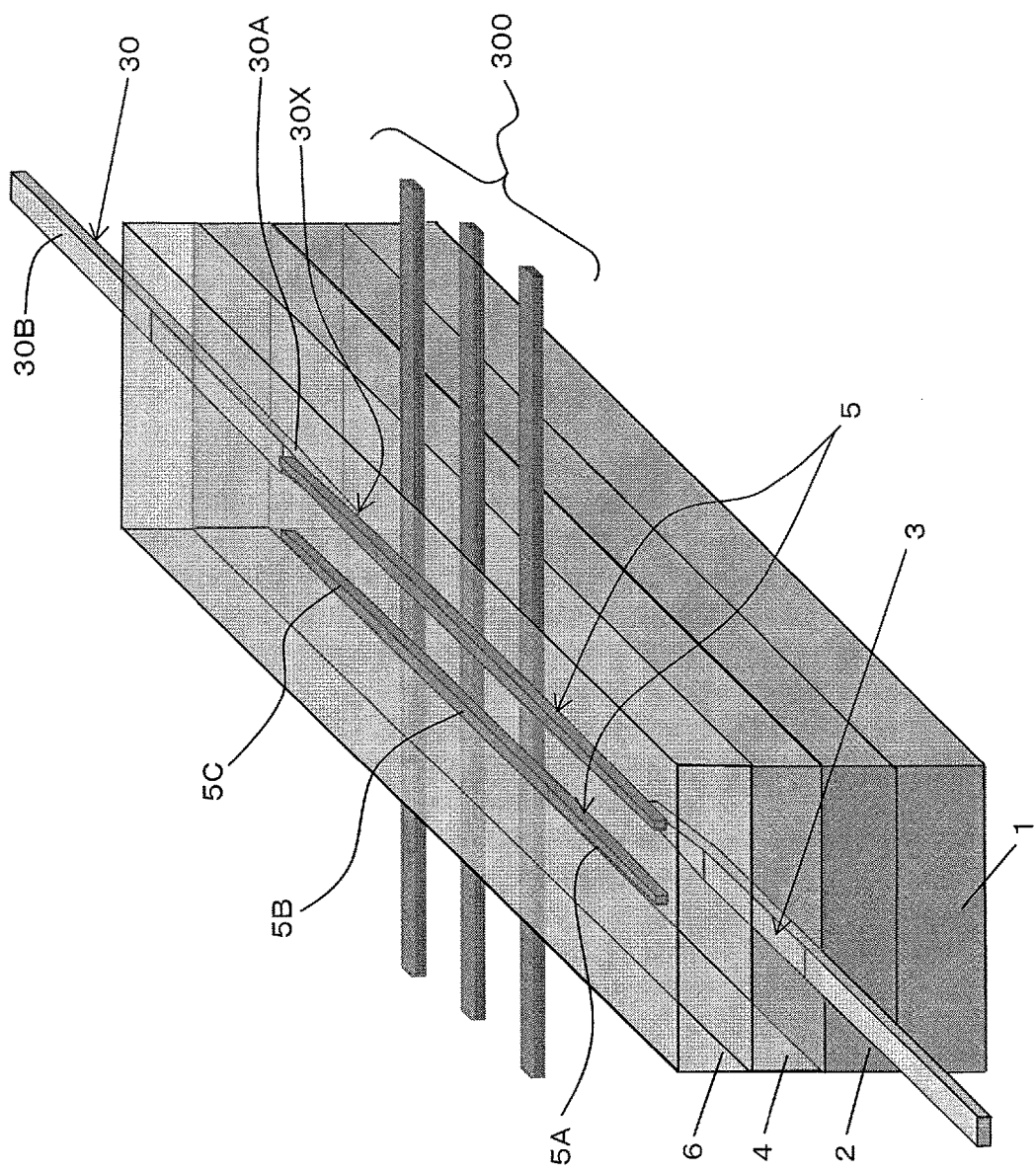
FIG. 6 is a schematic perspective view depicting a configuration of a first modification to the optical waveguide according to the present embodiment.

For example, the light may be propagated three-dimensionally from the waveguide including the plurality of SiN cores 5 of the upper layer to the waveguide including the different Si core 30 of the lower layer after the light is propagated three-dimensionally from the waveguide including the Si core 3 of the lower layer to the waveguide including the plurality of (here, two) the SiN cores 5 of the upper layer as depicted in FIG. 6. In short, the three-dimensional optical waveguide (stereoscopic optical waveguide) for propagating the propagation light three-dimensionally may be provided at two locations on one side and the other side that is the opposite side to the one side.

In this case, the different Si core 30 extends from the opposite side (the other side) to the one side and includes a terminal portion 30X, a taper region 30A having a sectional area that decreases toward the terminal portion 30X and a fixed sectional area region 30B contiguous to the opposite side to the one side of the taper region 30A and having a fixed sectional area. It is to be noted that the different Si core 30 is referred to also as third core. Further, the terminal portion 30X of the different Si core 30 is referred to also as second terminal portion. Further, the taper region 30A of the different Si core 30 is referred to also as third taper region. Further, the fixed sectional area region 30B of the different Si core 30 is referred to also as third fixed sectional area region. Further, the sectional area is an area of a cross section perpendicular to a direction extending from the one side to the other side (opposite side to the one side). The plurality of SiN cores 5 are provided over the different Si core 30 with the intermediate cladding layer 4 sandwiched therebetween and extend including a region corresponding to the taper region 30A of the different Si core 30. It is to be noted that the intermediate cladding layer 4 is referred to also as second cladding layer. Here, the plurality of SiN cores 5 extend from a position corresponding to the fixed sectional area region 30B of the different Si core 30 toward the one side. In this case, both of the Si core 3 and the different Si core 30 are provided on the lower cladding layer 2. Further, in this case, a three-dimensional crossover core 300 (grade separated crossing core; for example, an Si core) extending in a direction crossing with the plurality of SiN cores 5 may be provided. In this case, the Si core 300 as the three-dimensional crossover core is provided independently of the Si core 3 on the lower cladding layer 2. It is to be noted that this optical waveguide is referred to also as three-dimensional crossover optical waveguide or grade separated crossing optical waveguide. Further, it is preferable to be configured such that the plurality of SiN cores 5 each include a taper region 5C having a sectional area that decreases toward the opposite side to the one side so as to be contiguous to the opposite side to the one side, namely, to the opposite side to the one side of the fixed sectional area region 5B. In this case, the fixed sectional area region 5B is contiguous to the one side of the taper region 5C. In particular, it is preferable to be configured such that the plurality of SiN cores 5 each include the taper regions 5A and 5C on both sides of a direction (longitudinal direction) from the one side toward the opposite side to the one side with the fixed sectional area region 5B sandwiched therebetween. The terminal portion 30X of the different Si core 30 is positioned in the region corresponding to the fixed sectional area region 5B of the plurality of SiN cores 5. It is to be noted that the taper region 5C of the plurality of SiN cores 5 is referred to also as fourth taper region. Further, the sectional area is an area of a cross section perpendicular to a direction extending from the one side to the other side (opposite side to the one side). This is referred to as first modification.

In the optical waveguide of the present first modification, light having propagated in the region including the Si core 3 propagates three-dimensionally to the region including the plurality of SiN cores 5 and propagates as single mode light in the region including the plurality of SiN cores 5. Then, the light propagated in the region including the plurality of SiN cores 5 propagates three-dimensionally to the region including the different Si core 30 and then propagates in the region including the different Si core 30. On the other hand, light having propagated in the region including the Si core 300 as the three-dimensional crossover core provided on the same plane as that on which the Si core 3 and the different Si core 30 are provided propagates independently without interference with the light propagating from the Si core 3 toward the different Si core 30. It is to be noted that this similarly applies also to a case in which the light is propagated from the different Si core 30 toward the Si core 3. In this manner, two kinds of light propagating in the two directions different from each other in the region including the Si cores 3, 30 and 300 provided on the same lower cladding layer 2 can be crossed over with each other without interference therebetween, and the three-dimensional crossover optical waveguide having the low loss can be implemented.

It is to be noted that, while, in the first modification, the plurality of SiN cores 5 are provided over the different Si core 30 with the intermediate cladding layer 4 sandwiched therebetween, the present invention is not limited to this and the plurality of SiN cores may be provided under the different Si core with a different cladding layer sandwiched therebetween. It is to be noted that the different cladding layer is referred to also as second cladding layer. For example, by providing the different Si core 30 on the upper cladding layer 6, the plurality of SiN cores 5 are provided under the different Si core 30 with the upper cladding layer 6 as the different cladding layer sandwiched therebetween. In this case, a further different cladding layer may be provided so as to cover the different Si core 30 and the upper cladding layer 6.

Further, similarly as in the case of the first modification, the optical waveguide of the embodiment (refer to FIG. 1) described above may include the three-dimensional crossover core 300 (for example, an Si core), which extends in the direction crossing with the plurality of SiN cores 5, under the plurality of SiN cores 5 (particularly, the fixed sectional area region 5B of them). In this case, the Si core 300 as the three-dimensional crossover core is provided independently of the Si core 3 on the lower cladding layer 2.

Similarly, for example, while, in the embodiment, particular configuration example and modification described above (refer to FIGS. 2, 3A and 3B), light is propagated three-dimensionally from the waveguide including the Si core 3 of the lower layer to the waveguide including the two SiN cores 5 of the upper layer and is propagated in a plane from the waveguide including the two SiN cores 5 of the upper layer to the waveguide including the one different SiN core 50 in the same plane and then is propagated as single mode light in the waveguide including the one different SiN core 50, the present invention is not limited to this.

Figure 7:
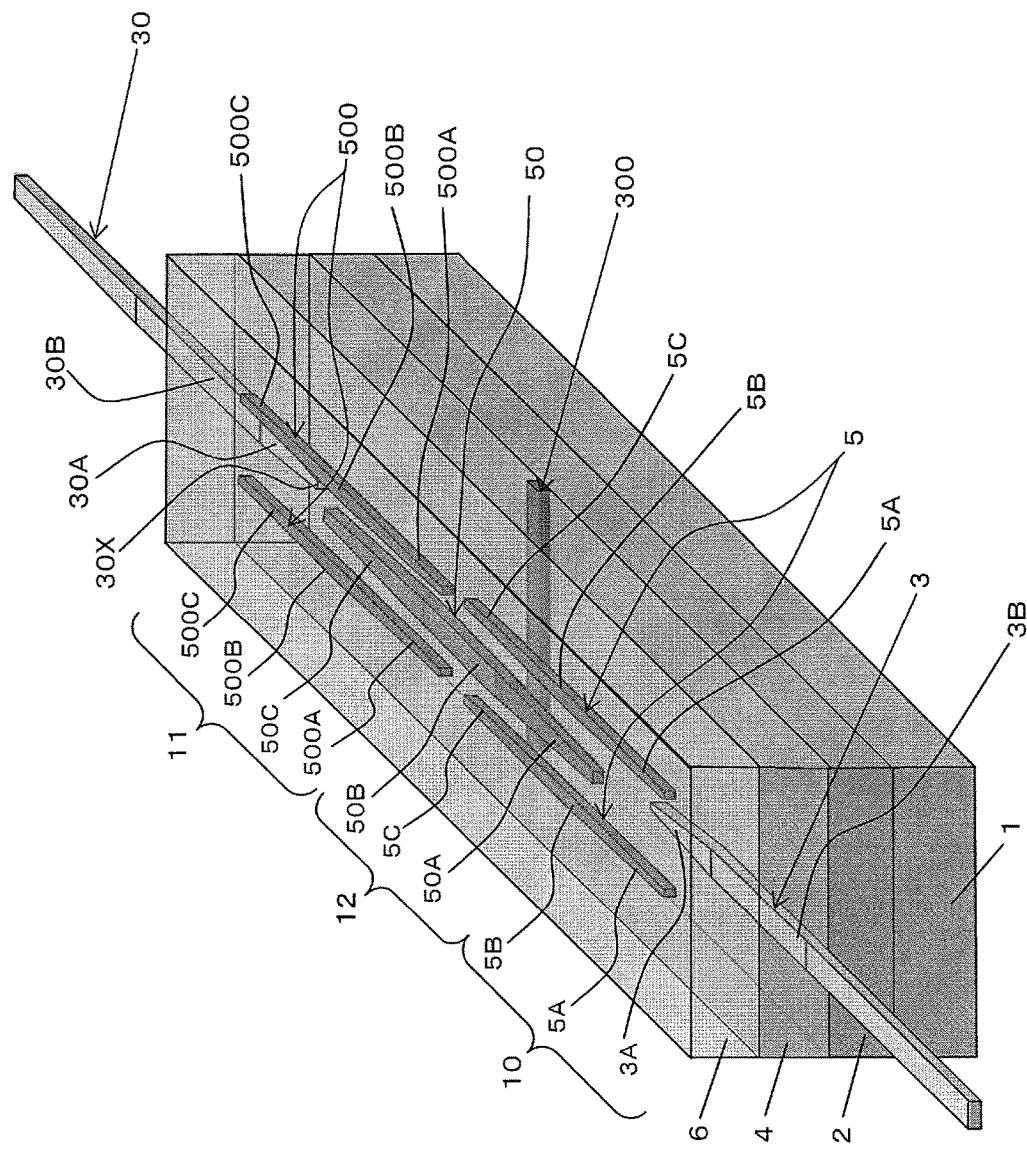
FIG. 7 is a schematic perspective view depicting a configuration of a second modification to the optical waveguide according to the present embodiment.

For example, the optical waveguide may be configured otherwise in such a manner as depicted in FIG. 7 that light is propagated three-dimensionally from the waveguide including the Si core 3 of the lower layer to the waveguide including the two SiN cores 5 of the upper layer and is propagated in a plane from the waveguide including the two SiN cores 5 of the upper layer to the waveguide including the one different SiN core 50 of the same plane and then the light is propagated in a plane from the waveguide including the one different SiN core 50 to the waveguide including two different SiN cores 500 in the same plane and is further propagated three-dimensionally from the waveguide including two different SiN cores 500 to the waveguide including the different Si core 30 of the lower layer. In short, the optical waveguide may include a first three-dimensional optical waveguide (first stereoscopic optical waveguide) 10 for propagating propagation light three-dimensionally, a second three-dimensional optical waveguide (first stereoscopic optical waveguide) 11 for propagating the propagation light three-dimensionally and a propagation unit 12 for propagating the propagation light between the optical waveguides 10 and 11.

It is to be noted that the optical waveguide depicted in FIG. 7 also can be configured such that two optical waveguides of the particular configuration example of the embodiment described above (or the modification to the same; refer to FIGS. 2, 3A and 3B) are prepared and the different SiN cores 50 included in the optical waveguides are connected so as to be contiguous to each other in a state in which the different SiN cores 50 are opposed to each other. In this case, the two SiN cores 5 on the one side and the two SiN cores 5 on the other side are connected optically to each other by the one different SiN core 50.

In particular, in the optical waveguide of the particular configuration example of the embodiment described above (or the modification to the same; refer to FIG. 2 or FIGS. 3A and 3B), the one different SiN core 50 additionally includes a different taper region 50C contiguous to the opposite side to the one side of the fixed sectional area region 50B (third fixed sectional area region) and having a sectional area that decreases toward the opposite side to the one side. It is to be noted that the different taper region 50C is referred to also as fifth taper region. Further, the sectional area is an area of a cross section perpendicular to the direction extending from the one side to the other side (opposite side to the one side). The optical waveguide further includes two different SiN cores 500 provided on both sides with respect to and extend in parallel to the one different SiN core 50 and also extend in parallel to each other from the one side toward the opposite side to the one side including the region corresponding to the different taper region 50C of the one different SiN core 50. The two different SiN cores 500 have, on the one side, a taper region 500A having a sectional area that increases toward the opposite side to the one side and have a fixed sectional area region 500B contiguous to the opposite side to the one side of the taper region 500A and having a fixed sectional area such that light propagating in the region including the two different SiN cores 500 forms a single optical mode. It is to be noted that the two different SiN cores 500 are referred to as fourth cores. Further, the taper region 500A of the two different SiN cores 500 is referred to also as sixth taper region. Further, the fixed sectional area region 500B of the two different SiN cores 500 is referred to also as fourth fixed sectional area region. Further, the sectional area is an area of a cross section perpendicular to the direction extending from the one side to the other side (opposite side to the one side). The optical waveguide further includes a different Si core 30 extending from the opposite side to the one side and including the terminal portion 30X and the taper region 30A having a sectional area that decreases toward the terminal portion 30X. In particular, the different Si core 30 is provided over the substrate 1 and extends from the other side to the one side and besides includes the taper region 30A having a sectional area that decreases toward the one side. It is to be noted that the different Si core 30 is referred to also as fifth core. Further, the terminal portion 30X of the different Si core 30 is referred to sometimes as second terminal portion. Further, the taper region 30A of the different Si core 30 is referred to also as seventh taper region. Further, the sectional area is an area of a cross section perpendicular to the direction extending from the one side to the other side (opposite side to the one side). Further, the two different SiN cores 500 are provided over the different Si core 30 with the intermediate cladding layer 4 sandwiched therebetween and extend in parallel to each other from the one side to the opposite side to the one side including the region corresponding to the taper region 30A of the different Si core 30. It is to be noted that the intermediate cladding layer 4 is referred to also as second cladding layer. Further, it is preferable to be configured such that the different Si core 30 includes the fixed sectional area region 30B contiguous to the opposite side to the one side of the taper region 30A and having a fixed sectional area. It is to be noted that the fixed sectional area region 30B is referred to also as fifth fixed sectional area region. Further, the sectional area is an area of a cross section perpendicular to the direction extending from the one side to the other side (opposite side to the one side). Here, the two different SiN cores 500 extend from a position corresponding to the fixed sectional area region 30B of the different Si core 30 toward the one side. In this case, both of the Si core 3 and the different Si core 30 are provided on the lower cladding layer 2. Further, in this case, the optical waveguide may include the three-dimensional crossover core 300 (grade separated crossing core; for example, an Si core) extending in a direction crossing with the one different SiN core 50 under the one different SiN core 50 (particularly, under the fixed sectional area region 50B of the SiN core 50). In this case, the Si core 300 as the three-dimensional crossover core is provided independently of the Si cores 3 and 30 on the lower cladding layer 2. It is to be noted that the optical waveguide is referred to as also three-dimensional crossover optical waveguide or grade separated crossing optical waveguide. Further, it is preferable to be configured such that the two different SiN cores 500 each include the taper region 500C having a sectional area that decreases toward the opposite side to the one side so as to be contiguous to the opposite side to the one side, namely, to the opposite side to the one side of the fixed sectional area region 500B. In this case, the fixed sectional area region 500B is contiguous to the one side of the taper region 500C. In short, it is preferable to be configured such that the two different SiN cores 500 each include the taper regions 500A and 500C on both sides of a direction (longitudinal direction) from the one side toward the opposite side to the one side with the fixed sectional area region 500B sandwiched therebetween. The terminal portion 30X of the different Si core 30 is positioned in the region corresponding to the fixed sectional area region 500B of the two different SiN cores 500. It is to be noted that the taper region 500C of the two different SiN cores 500 is referred to also as eighth taper region. Further, the sectional area is an area of a cross section perpendicular to the direction extending from the one side to the other side (opposite side to the one side). The configuration described is referred to as second modification.

In the optical waveguide of the present second modification, light having propagated in the region including the Si core 3 propagates three-dimensionally to the region including the two SiN cores 5 and then propagates in a plane to the region including the one different SiN core 50 in the same plane. Then, the propagation light propagates in the region including the one different SiN core 50 and propagates in a plane to the region including the two different SiN cores 500 in the same plane, and then propagates three-dimensionally to the region including the different Si core 30 and propagates through the region including the different Si core 30. On the other hand, light having propagated in the region including the Si core 300 as the three-dimensional crossover core provided on the same plane as that on which the Si cores 3 and 30 are provided propagates independently without interference with the light propagated from the Si core 3 toward the different Si core 30. It is to be noted that this similarly applies also to a case in which light is propagated from the different Si core 30 toward the Si core 3. In this manner, the two kinds of light propagating in the two directions in the region including the Si cores 3, 30 and 300 provided on the same lower cladding layer 2 can be crossed over without interference of the light with each other, and the three-dimensional crossover optical waveguide of low loss can be implemented. Further, in the optical waveguide of the present second modification, if the length of the region including the two SiN cores 5 which form a single optical mode or the length of the region including the two different SiN cores 500 which form a single optical mode is set longer, then the propagation loss increases. Therefore, the region including the one different SiN core 50 is interposed between the region including the two SiN cores 5 and the region including the two different SiN cores 500 and the length of the region including the two SiN cores 5 or the length of the region including the two different SiN cores 500 is set shorter so that the propagation loss decreases. Since the region including the one different SiN core 50 is used for the propagation of light between the region including the two SiN cores 5 and the region including the two different SiN cores 500 in this manner, with the optical waveguide of the present second modification, the propagation loss can be decreased from that of the optical waveguide of the first modification (refer to FIG. 6) described hereinabove. In the optical waveguide of the present second modification, the length of the region including the one different SiN core 50 can be set long. In particular, since the propagation loss can be decreased, optical interconnection over a long distance can be implemented. For example, even if the Si core 3 and the different Si core 30 are spaced from each other and the length of the one different SiN core 50 is set longer, for example, from several mm to substantially several cm, the three-dimensional crossover optical waveguide of low loss can be implemented. It is to be noted that, where the distance between the Si core 3 and the different Si core 30 is not very long (for example, where the distance is such as to merely cross the Si core 300 as the three-dimensional crossover core is set; for example, approximately several 100 nm), the three-dimensional crossover optical waveguide of low loss can be implemented only if the optical waveguide (refer to FIG. 6) of the first modification described above is used.

It is to be noted that the one different SiN core 50 may have a curved portion. In particular, light propagates three-dimensionally from the region including the Si core 3 to the region including the two SiN cores 5 and then propagates two-dimensionally from the region including the two SiN cores 5 to the region including the one different SiN core 50 and thereafter propagates in the region including the one different SiN core 50. In this case, the region including the one different SiN core 50 may include a curved waveguide region.

It is to be noted that, while, in the present second modification, the two different SiN cores 500 are provided over the different Si core 30 with the intermediate cladding layer 4 sandwiched therebetween, the present invention is not limited to this and the two different SiN cores may be provided under the different Si core 30 with a different cladding layer sandwiched therebetween. It is to be noted that the different cladding layer is referred to also as second cladding layer. For example, by providing the different Si core 30 on the upper cladding layer 6, the two different SiN cores 500 can be provided under the different Si core 30 with the upper cladding layer 6 as the different cladding layer sandwiched therebetween. In this case, a further different cladding layer may be provided so as to cover the different Si core 30 and the upper cladding layer 6.

Further, similarly as in the case of the second modification, in the particular configuration example of the embodiment described above (or in the modification to the same; refer to FIG. 2 or FIGS. 3A and 3B), a three-dimensional crossover core (grade separated crossing core; for example, an Si core) extending in a direction crossing with the one different SiN core 50 may be provided under the one different SiN core 50 (particularly, under the fixed sectional area region 50B of the SiN core 50). In this case, the Si core as the three-dimensional crossover core is provided independently of the Si core 3 and the different Si core 30 on the lower cladding layer 2.

It is to be noted that, while, in the embodiment and the modifications described above, the Si core is used for the core provided on the lower side and the SiN core is used for the core provided on the upper side, the present invention is not limited to this and the Si core may be used for both of the cores. In this case, for example, the width of the portion of each Si core at which it is widest may be set to approximately 450 nm. Further, where the one different Si core is used in place of the one different SiN core 50 configuring the propagation unit 12 in the optical waveguide (refer to FIG. 7) of the second modification described above, an Si core having a greater width may be interposed in the fixed sectional area region of the Si core. For example, where an Si core having a width of approximately 450 nm is used as the one different core configuring the propagation unit 12, an Si core having a width of approximately 2 µm may be interposed in the fixed sectional area region of the former Si core. In particular, the one different Si core configuring the propagation unit 12 may include a first narrow portion having a width of approximately 450 nm, a wide portion having a width of approximately 2 µm, a second narrow portion having a width of approximately 450 nm, a first taper portion connecting the first narrow portion and the wide portion to each other and having a width that increases from the first narrow portion toward the wide portion and a second taper portion connecting the wide portion and the second narrow portion to each other and having a width that decreases from the wide portion toward the second narrow portion. In this case, the one different Si core configuring the propagation unit 12 includes a spot size converter for converting a mode shape (spot size) of propagation light. In short, the one different Si core configuring the propagation unit 12 may include the spot size converter. Consequently, the propagation loss can be decreased and a longer optical interconnection can be implemented.

Further, in the embodiment (including the particular configuration example and the modification thereto) and the modifications described above, it can be determined arbitrarily by what number of layers the light is to be propagated three-dimensionally and upwardly or downwardly. For example, the light may be propagated three-dimensionally upwardly by one layer and further propagated three-dimensionally upwardly by one layer, or the light may be propagated three-dimensionally downwardly by one layer and further propagated three-dimensionally downwardly by one layer.

Incidentally, also it is possible to configure such an optical interposer 20 as depicted in FIG. 8 using the optical waveguide of any of the embodiment (including the particular configuration example of and the modification to the same) and the modifications to the embodiment described hereinabove. In this case, the optical interposer 20 may include a substrate 21, an optical waveguide (three-dimensional optical waveguide; three-dimensional crossover optical waveguide) 22 provided on the substrate 21 and configured in such a manner as in any of the embodiment and modifications described hereinabove, a light emitter 23 provided on the substrate 21, an optical modulator 24 provided on the substrate 21 and an optical detector 25 provided on the substrate 21. Here, as the light emitter 23, for example, a semiconductor laser may be used. Further, as the optical modulator 24, for example, a Mach-Zehnder type optical modulator may be used. It is to be noted that the optical detector 25 is referred to also as light receiver. For example, the optical interposer can be implemented in the following manner. In particular, a transmitter-receiver 26 including the optical modulator 24 and the light receiver 25 and the light emitter 23 are mounted on the Si substrate 21 (SOI substrate), and the lower optical waveguide (waveguide including the Si core 3) of the optical waveguide 22 configured in such a manner as in any of the embodiment and modifications described hereinabove is connected to each of the optical modulator 24 and the light receiver 25. Further, the upper optical waveguide (waveguide including the SiN cores 5 and 50) of the optical waveguide 22 configured in such a manner as in any of the embodiment and modifications described hereinabove is connected to the light emitter 23. Further, the lower optical waveguide (waveguide including the Si core 300 as the three-dimensional crossover core) as an optical interconnection for signal processing extending in a direction crossing with the upper optical waveguide is provided under the upper optical waveguide. Further, the lower optical waveguide 27 (waveguide including the Si core 300X) as an optical interconnection for signal processing is connected to each of the optical modulator 24 and the light receiver 25. In this case, the optical modulator 24 modulates the light inputted through the optical waveguide 22 configured in such a manner as in any of the embodiment and modifications described hereinabove. Further, the light receiver 25 receives and detects the light guided through the lower optical waveguide 27 as the optical interconnection for signal processing. Further, where input light is inputted from the outside in place of the light emitter 23, an end portion of the upper optical waveguide of the optical waveguide 22 configured in such a manner as in any of the embodiment and modifications described hereinabove serves as an input end for inputting input light from the outside. Further, in the proximity of the transmitter-receiver 26, the upper optical waveguide of the optical waveguide 22 configured in such a manner as in any of the embodiment and modifications described hereinabove and the lower optical waveguide 27 as the optical interconnection for signal processing cross three-dimensionally with each other. In other words, the three-dimensional crossover optical waveguide in any of the embodiment and modifications described hereinabove is provided in the proximity of the transmitter-receiver 26. Therefore, the interconnection density and the signal density can be improved. Further, the integration circuit 28 is disposed at an upper portion of the transmitter-receiver 26. In this case, as the light emitter 23, an array laser diode (LD) may be used. In such an optical interposer 20 as described above, between the light emitter 23 and the transmitter-receiver 26 connected to each other through the optical waveguide 22 of any of the embodiment and modifications described hereinabove, light outputted from the light emitter 23 is inputted from an end face of the upper optical waveguide of the optical waveguide 22 of any of the embodiment and modifications described above, propagates three-dimensionally from the upper optical waveguide to the lower optical waveguide, and then is guided from the lower optical waveguide to the transmitter-receiver 26. Further, the transmission and reception of the optical signal by the transmitter-receiver 26 are performed through the lower optical waveguide 27 connected as the optical interconnection for signal processing to the transmitter-receiver 26. Further, since the upper optical waveguide of the optical waveguide 22 configured in such a manner as in any one the embodiment and modifications described hereinabove and the lower optical waveguide 27 as the optical interconnection for signal processing cross three-dimensionally with each other, the upper optical waveguide (transmission optical interconnection) in which light having a high light intensity from the light emitter 23 propagates and the lower optical waveguide 27 as the optical interconnection for signal processing can be separated from each other and crosstalk between the interconnections can be reduced. Such an optical interposer 20 as described above is advantageous in that, since it includes the optical waveguide 22 of any of the embodiment and modifications described hereinabove, while propagation light is propagated three-dimensionally, the fabrication yield can be increased and the propagation loss (waveguide loss) is decreased.

Further, also it is possible to configure such a light source 40 as depicted in FIGS. 9A and 9B using the optical waveguide of any of the embodiment (including the particular configuration example and the modification thereto) and modifications to the embodiment described above. In this case, the light source 40 may include a substrate 41, an optical waveguide 42 (three-dimensional optical waveguide; three-dimensional crossover optical waveguide) provided on the substrate 41 and configured in such a manner as in any of the embodiment and the modifications described hereinabove, and a light emitter 43 provided on the substrate 41. Here, as the light emitter 43, for example, a semiconductor laser (laser diode; LD) may be used. For example, the LD 43 having three output terminals is mounted on the Si substrate 41 (SOI substrate), and a first optical waveguide 44, a second optical waveguide 45 and a third optical waveguide 46 are connected to the three output terminals of the LD 43. For example, the distance between the three output terminals of the LD 43 is approximately 30 μm. Cores configuring the first to third optical waveguides 44 to 46 include portions 44A, 45A and 46A on the side on which they are connected to the LD 43, portions 44C, 45C and 46C in the proximity of the output end of the light source 40, and intermediate portions 44B, 45B and 46B between the portions 44A to 46A and the portions 44C to 46C. The portions 44A to 46A on the side on which they are connected to the LD 43 of the cores configuring the first to third optical waveguides 44 to 46 and the portions 44C to 46C in the proximity of the output end of the light source 40 are provided so as to be positioned on the same plane. On the other hand, the intermediate portions 44B to 46B of the cores configuring the first to third optical waveguides 44 to 46 are provided so as to be positioned on planes different from each other. Here, the portions 44A to 46A of the cores configuring the first to third optical waveguides 44 to 46 on the side on which they are connected to the LD 43 and the portions 44C to 46C in the proximity of the output end of the light source 40 are provided so as to be positioned on a first intermediate cladding layer 48A. Further, the intermediate portion 44B of the core configuring the first optical waveguide 44 is provided so as to be positioned on a lower cladding layer (BOX layer) 47. The intermediate portion 45B of the core configuring the second optical waveguide 45 is provided so as to be positioned on the first intermediate cladding layer 48A. The intermediate portion 46B of the core configuring the third optical waveguide 46 is provided so as to be positioned on a second intermediate cladding layer 48B. It is to be noted that the intermediate portion 46B of the core configuring the third optical waveguide 46 positioned on the second intermediate cladding layer 48B is covered with an upper cladding layer 49. The optical waveguide (three-dimensional optical waveguide) 42 configured in such a manner as in any of the embodiment and modifications described hereinabove is applied between the portion 44A of the core configuring the first optical waveguide 44 on the side on which it is connected to the LD 43 and the intermediate portion 44B and between the intermediate portion 44B and the portion 44C in the proximity of the output end of the light source 40. Further, an optical waveguide (three-dimensional optical waveguide) 42A configured in such a manner as in any of the embodiment and modifications described hereinabove is applied between the portion 46A of the core configuring the third optical waveguide 46 on the side on which it is connected to the LD 43 and the intermediate portion 46B and between the intermediate portion 46B and the portion 46C in the proximity of the output end of the light source 40. Further, the first to third optical waveguides 44 to 46 individually have four output ends at the output end of the light source 40 by branching the cores configuring the optical waveguides at the intermediate portions 44B to 46B thereof. In short, the light source 40 has the 12 output ends. For example, the distance between adjacent ones of the 12 output ends here is approximately 5 μm. In this case, the cores of the intermediate portions 44B to 46B of the first to third optical waveguides 44 to 46 are provided on planes different from each other and cross three-dimensionally with each other. A three-dimensional optical waveguide 42B of any of the embodiment and modifications described hereinabove is applied to such a three-dimensionally crossing location as just described. The light source 40 (high-density light source) can be implemented in this manner.

In such a light source 40 as described above, light from the three output ends of the LD 43 is inputted to the first to third optical waveguides 44 to 46. The light inputted to the first optical waveguide 44 propagates (is guided) three-dimensionally, between the portion 44A of the core configuring the first optical waveguide 44 on the side on which it is connected to the LD 43 and the intermediate portion 44B, from the upper optical waveguide to the lower optical waveguide of the optical waveguide 42A (42) configured in such a manner as in any of the embodiment and modifications described hereinabove and then propagates in the lower optical waveguide while being branched. Then, the propagated light propagates, between the intermediate portion 44B and the portions 44C in the proximity of the output end of the light source 40, three-dimensionally from the lower optical waveguide to the upper optical waveguide of the optical waveguide 42A (42) configured in such a manner as in any of the embodiment and modifications described hereinabove and then propagates in the upper optical waveguide, whereafter it is outputted from the output end. Meanwhile, the light inputted to the second optical waveguide 45 propagates in the same plane, namely, propagates through the portion 45A of the core configuring the second optical waveguide 45 on the side on which it is connected to the LD 43, the intermediate portion 45B and the portion 45C in the proximity of the output end of the light source 40 and is outputted from the output end. Further, the light inputted to the third optical waveguide 46 propagates, between the portion 46A of the core configuring the third optical waveguide 46 on the side on which it is connected to the LD 43 and the intermediate portion 46B, three-dimensionally from the lower optical waveguide to the upper optical waveguide of the optical waveguide 42A (42) configured in such a manner as in any of the embodiment and modifications described hereinabove and then propagates in the upper optical waveguide while being branched. Then, the propagated light propagates, between the intermediate portion 46B and the portion 46C in the proximity of the output end of the light source 40, three-dimensionally from the upper optical waveguide to the lower optical waveguide of the optical waveguide 42A (42) configured in such a manner as in any of the embodiment and modifications described hereinabove and propagates in the lower optical waveguide and then is outputted from the output end. In this manner, the light from the three output ends of the LD 43 is divided into three layers by the first to third optical waveguides 44 to 46 and propagates three-dimensionally and then is branched by the layers, whereafter it propagates on the same plane in the proximity of the output end of the light source 40 and is outputted. In such a light source 40 as described above, since the light is propagated three-dimensionally into different layers and then branched in the individual layers and then the branched light fluxes cross three-dimensionally with each other, the light source 40 can be configured compact in comparison with that in an alternative case in which light is branched in the same layer. In short, the light source 40 that is compact and high in density can be implemented. Further, since such a light source 40 as described above includes the optical waveguide 42 of any of the embodiment and modifications described hereinabove, there is an advantage that, when propagation light is propagated three-dimensionally, the fabrication yield can be increased while the propagation loss (waveguide loss) is decreased.

All examples and conditional language recited herein are intended for pedagogical purposes to aid the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide, comprising:
   a substrate;
   a first core provided over the substrate and having a first taper region that extends from a first side toward a second side being the opposite side to the first side and has a sectional area that decreases toward the second side; and
   a plurality of second cores provided over the substrate and over or under the first core with a first cladding layer sandwiched therebetween and extending in parallel to the substrate and the first core,
   wherein the first core is positioned on an inner side with respect to two second cores positioned on the most outer sides as viewed from above from among the plurality of the second cores, and
   wherein the first taper region and each second core of the plurality of the second cores have a portion overlapping with each other in an extending direction of the first core and the second core.

2. The optical waveguide according to claim 1, wherein the first taper region is a width taper region having a width that decreases toward the second side.

3. The optical waveguide according to claim 1, wherein the plurality of second cores individually have, on the first side, a second taper region having a sectional area that increases toward the second side.

4. The optical waveguide according to claim 3, wherein the second taper region is a width taper region that increases in width toward the second side.

5. The optical waveguide according to claim 3, wherein the plurality of second cores individually have a second fixed sectional area region contiguous to the second side of the second taper region and having a fixed sectional area; and
the first core is terminated at a position corresponding to the second fixed sectional area region.

6. The optical waveguide according to claim 1, wherein the first core has a first fixed sectional area region contiguous to the first side of the first taper region and having a fixed sectional area; and
the plurality of second cores individually extend from a position corresponding to the first fixed sectional area region toward the second side.

7. The optical waveguide according to claim 1, further comprising:
a third core provided over the substrate and having a third taper region that extends from the second side toward the first side and has a sectional area that decreases toward the first side; and
the plurality of second cores are provided over or under the third core with a second cladding layer sandwiched therebetween.

8. The optical waveguide according to claim 7, wherein the plurality of second cores individually have, on the second side, a fourth taper region having a sectional area that decreases toward the second side.

9. The optical waveguide according to claim 8, wherein the plurality of the second cores individually have a second fixed sectional area region contiguous to the first side of the fourth taper region and having a fixed sectional area; and
the third core is terminated at a position corresponding to the second fixed sectional area region.

10. The optical waveguide according to claim 7, wherein the third core has a third fixed sectional area region contiguous to the second side of the third taper region and having a fixed sectional area; and
the plurality of second cores individually extend from a position corresponding to the third fixed sectional area region toward the first side.

11. The optical waveguide according to claim 1, further comprising an overhead crossing core provided under the second core and extending in a direction crossing with the second core.

12. The optical waveguide according to claim 1, wherein, as the plurality of the second cores, two second cores are provided which individually have, on the second side, a third taper region having a sectional area that decreases toward the second side, and a second fixed sectional area region contiguous to the first side of the third taper region and having a fixed sectional area; and
the optical waveguide further comprises a third core provided between the two second cores and extending in parallel to the two second cores, the third core having, on the first side, a fourth taper region having a sectional area that increases toward the second side and a third fixed sectional area region contiguous to the second side of the fourth taper region and having a fixed sectional area.

13. The optical waveguide according to claim 12, wherein the third core has a fifth taper region contiguous to the second side of the third fixed sectional area region and having a sectional area that decreases toward the second side;
the optical waveguide further comprises:
two fourth cores provided on opposite sides with respect to the third core and extending in parallel to the third core, the two fourth cores individually having, on the first side, a sixth taper region having a sectional area that increases toward the second side and a fourth fixed sectional area region contiguous to the second side of the sixth taper region and having a fixed sectional area; and
a fifth core provided over the substrate and having a seventh taper region extending from the second side toward the first side and having a sectional area that decreases toward the first side; and
the two fourth cores are individually provided over or under the fifth core with the second cladding layer sandwiched therebetween.

14. The optical waveguide according to claim 13, wherein the two fourth cores individually have an eighth taper region contiguous to the second side of the fourth fixed sectional area region and having a sectional area that decreases toward the second side.

15. The optical waveguide according to claim 13, wherein the fifth core has a fifth fixed sectional area region contiguous to the second side of the seventh taper region and having a fixed sectional area; and
the two fourth cores individually extend from a position corresponding to the fifth fixed sectional area region toward the first side.

16. The optical waveguide according to claim 13, wherein the fifth core is terminated at a position corresponding to the fourth fixed sectional area region.

17. The optical waveguide according to claim 12, further comprising an overhead crossing core provided under the third core and extending in a direction crossing with the third core.

18. An optical interposer, comprising:
a substrate;
an optical waveguide provided on the substrate;
an optical modulator provided on the substrate; and
an optical detector provided on the substrate; wherein the optical waveguide includes:
a first core provided over the substrate and having a first taper region extending from a first side toward a second side being the opposite side to the first side and having a sectional area that decreases toward the second side; and
a plurality of second cores provided over the substrate and over or under the first core with a first cladding layer sandwiched therebetween and extending in parallel to the substrate and the first core,
wherein the first taper region and each second core of the plurality of the second cores have a portion overlapping with each other in an extending direction of the first core and the second core.

19. The optical interposer according to claim 18, further comprising an overhead crossing core provided under the second core and extending in a direction crossing with the second core.

20. A light source, comprising:
a substrate;
an optical waveguide provided on the substrate; and a light emitter provided on the substrate; wherein the optical waveguide includes:
a first core provided over the substrate and having a first taper region extending from a first side toward a second side being the opposite side to the first side and having a sectional area that decreases toward the second side; and
a plurality of second cores provided over the substrate and over or under the first core with a first cladding layer sandwiched therebetween and extending in parallel to the substrate and the first core,
wherein the first taper region and each second core of the plurality of the second cores have a portion overlapping with each other in an extending direction of the first core and the second core.

* * * * *